Figure 18:
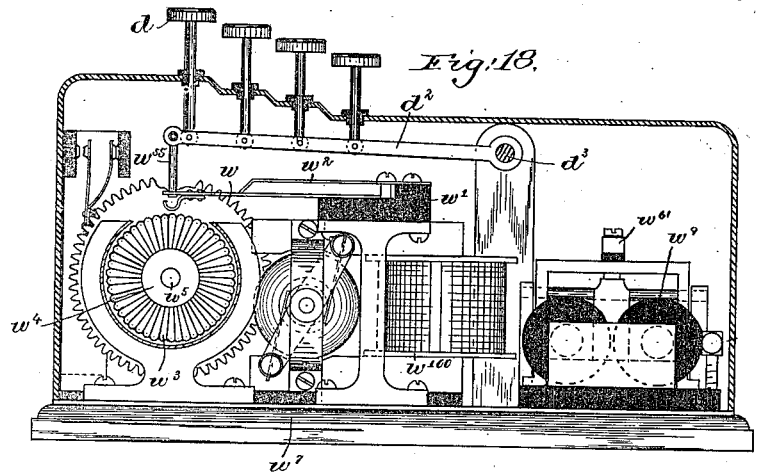

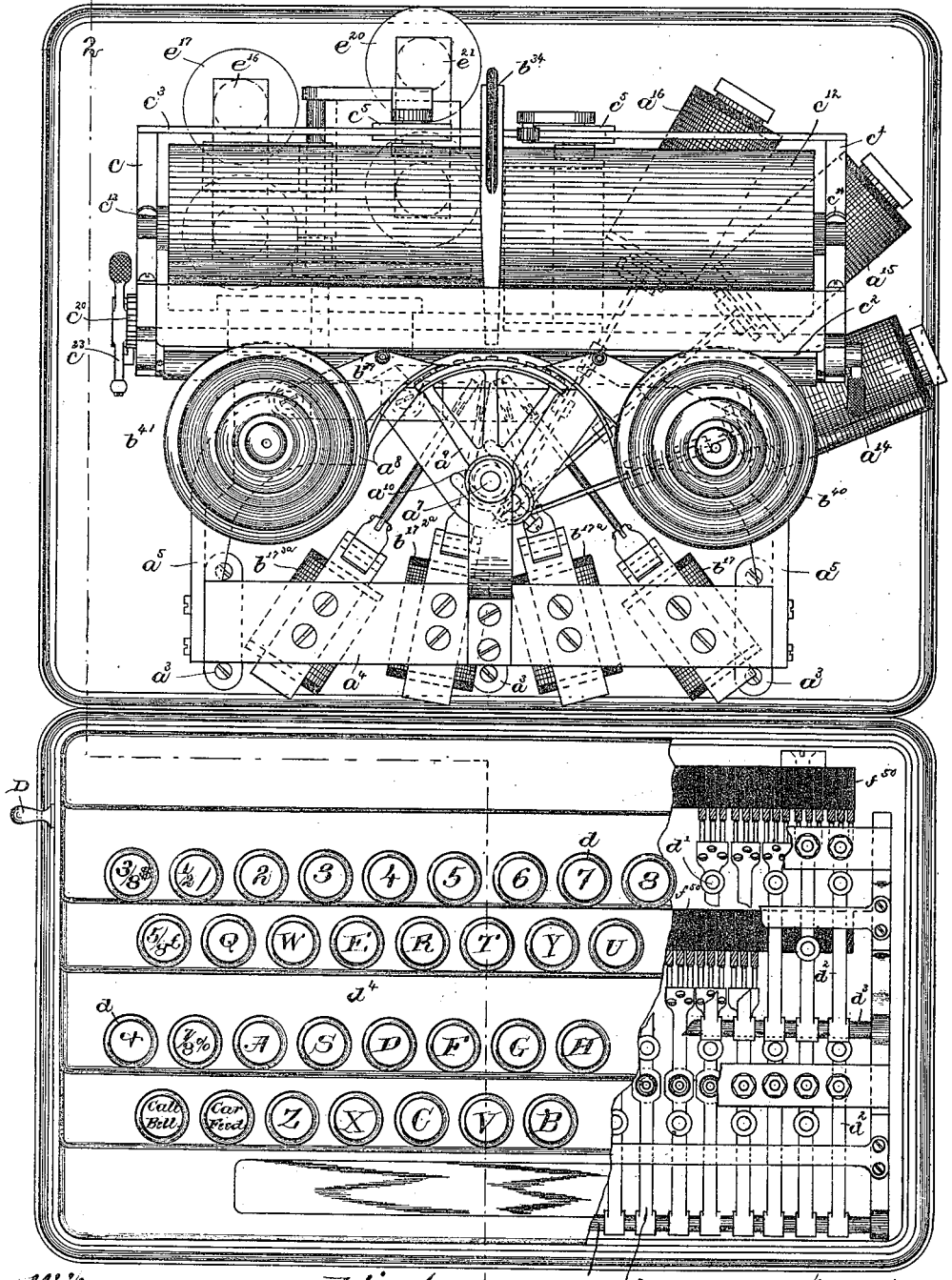

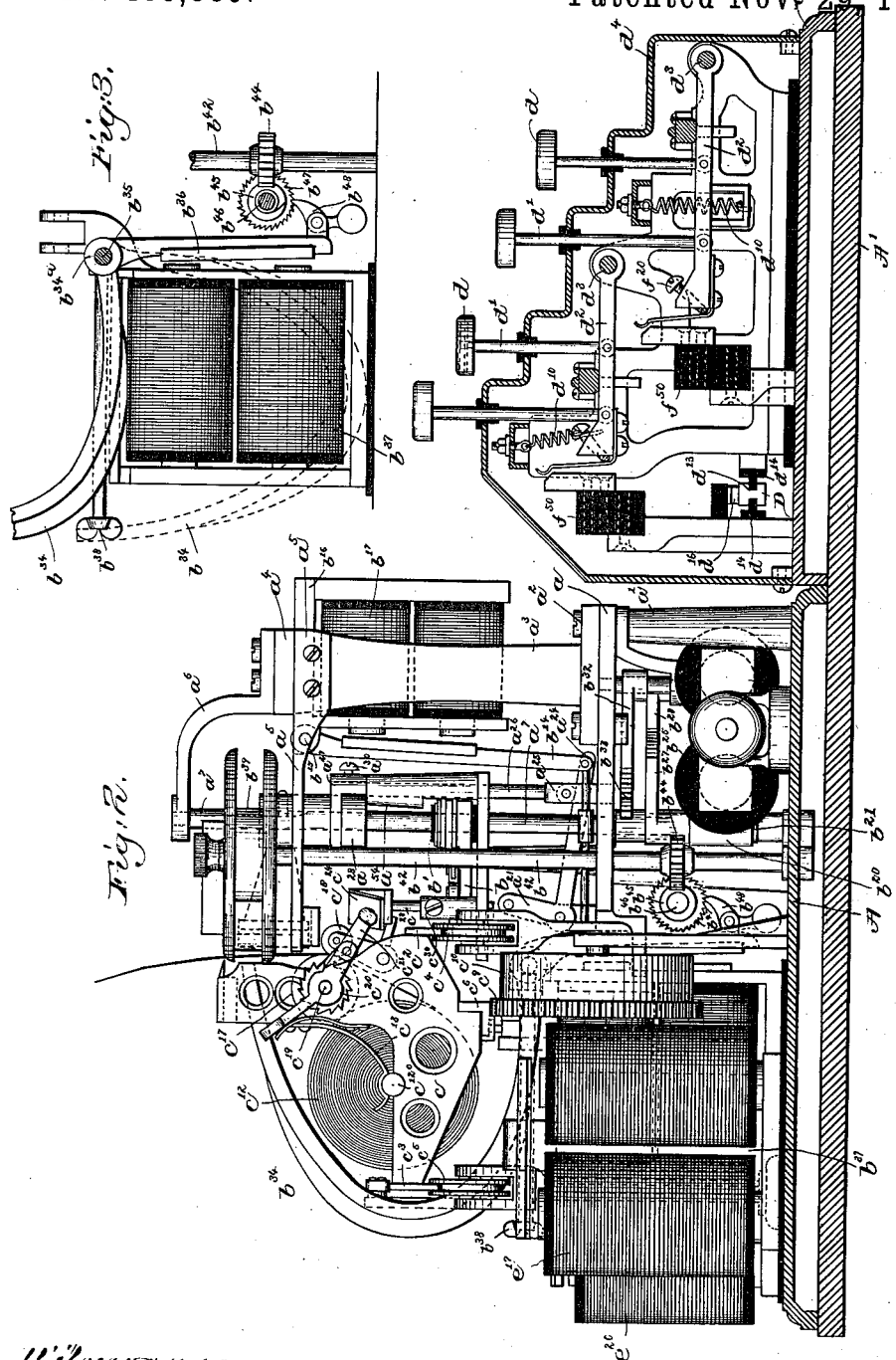

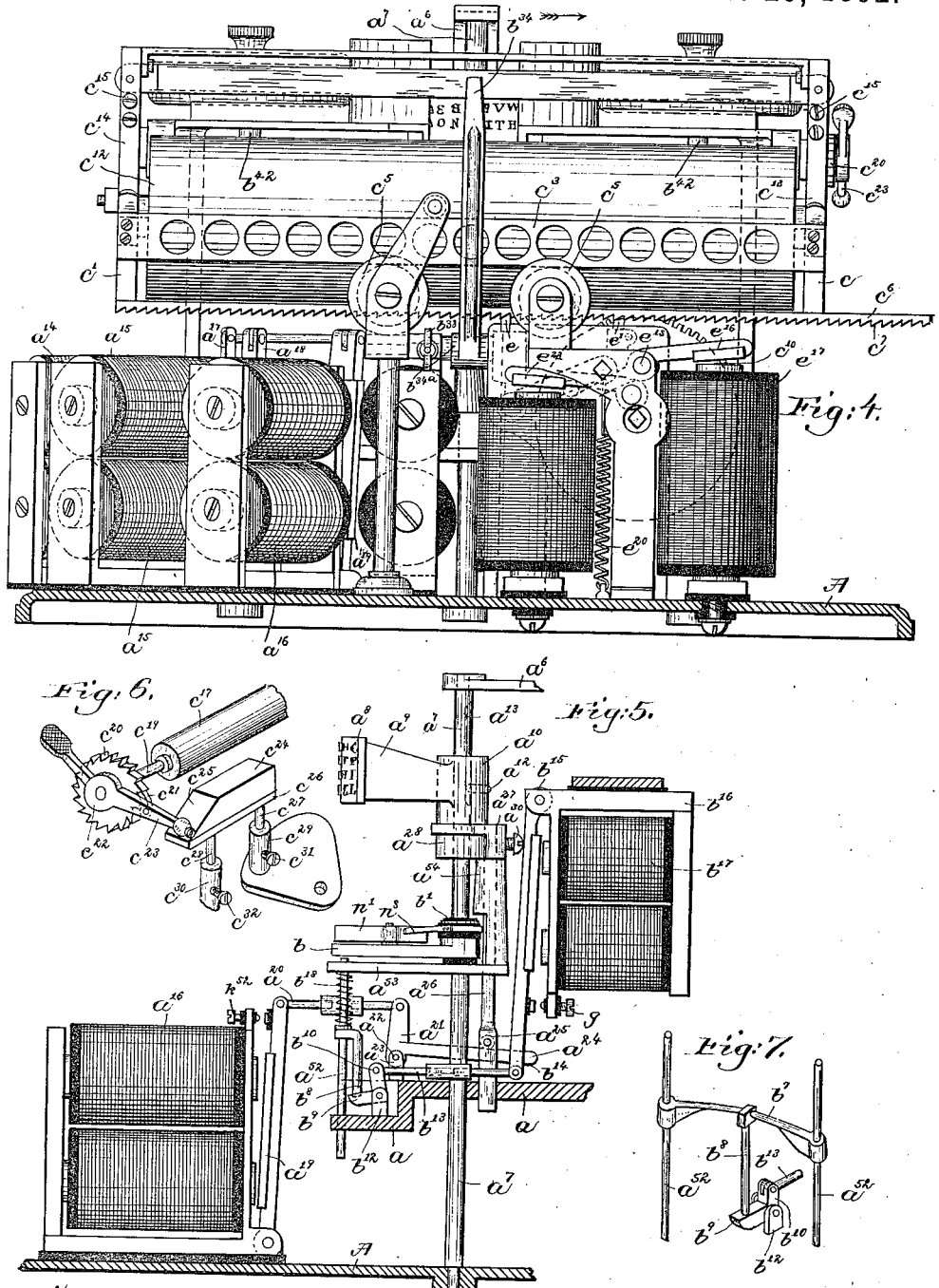

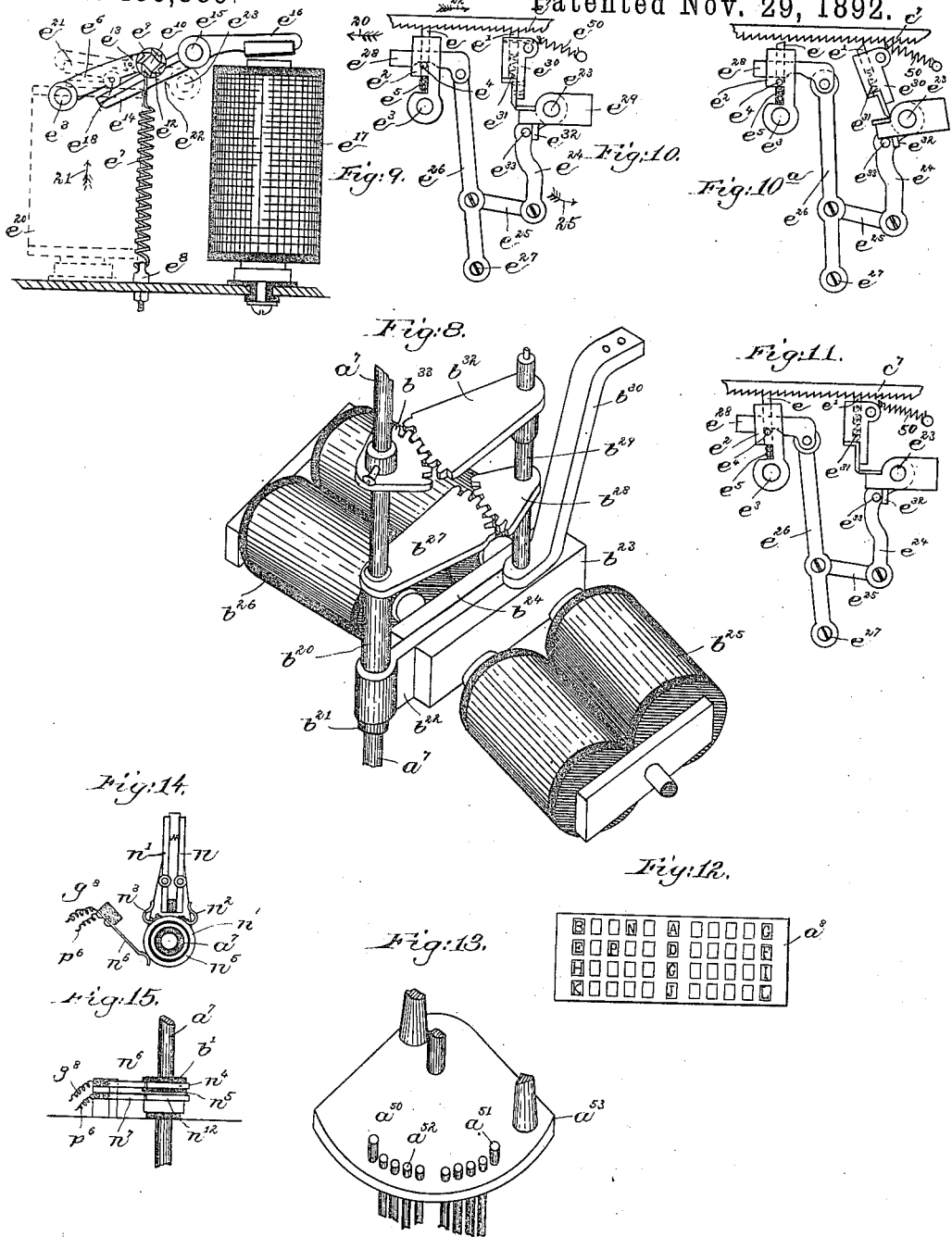

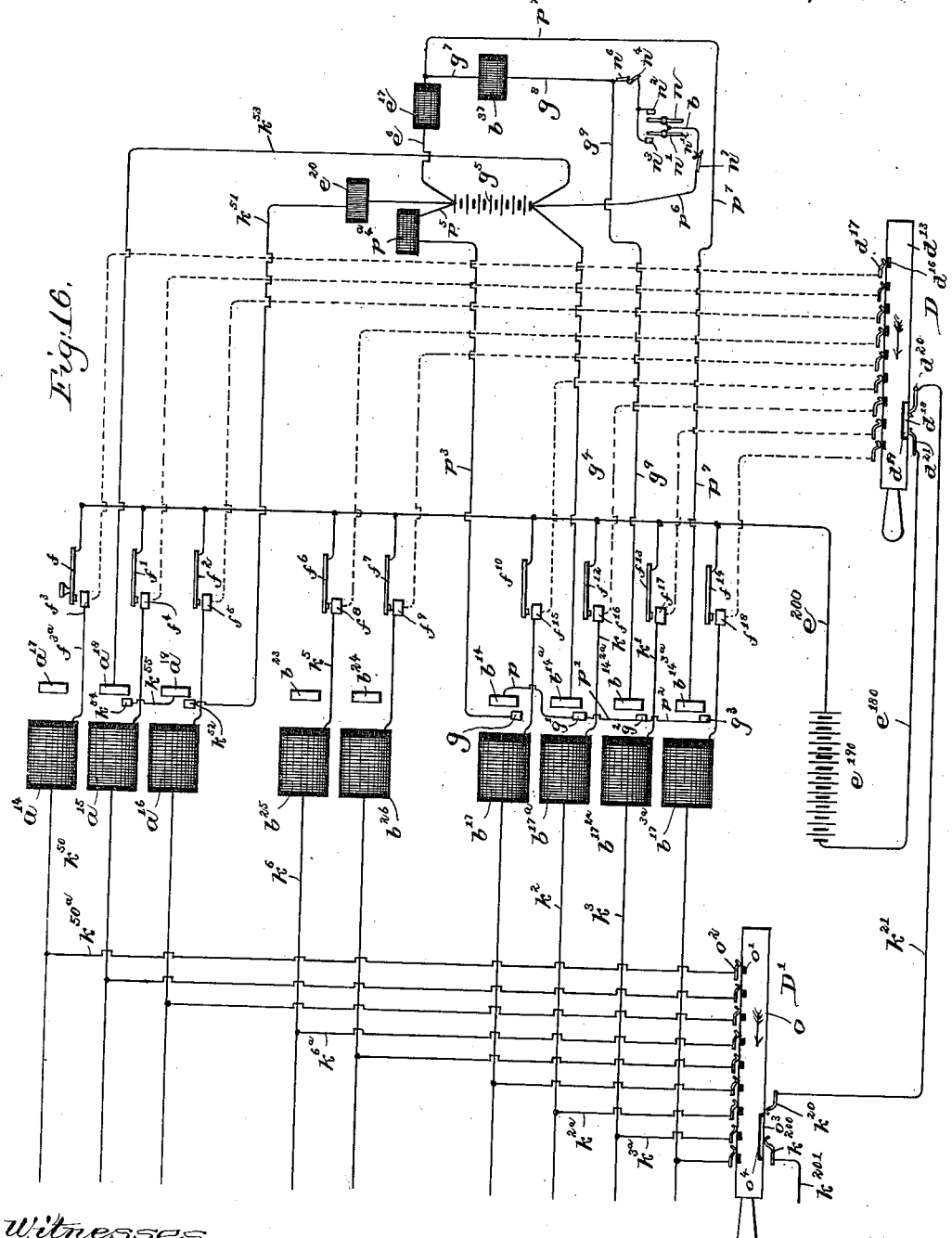

(No Model.) 9 Sheets—Sheet 6.
A. D. NEAL & H. F. EATON.
TYPE WRITING AND PRINTING INSTRUMENT.
No. 486,889. Patented Nov. 29, 1892.
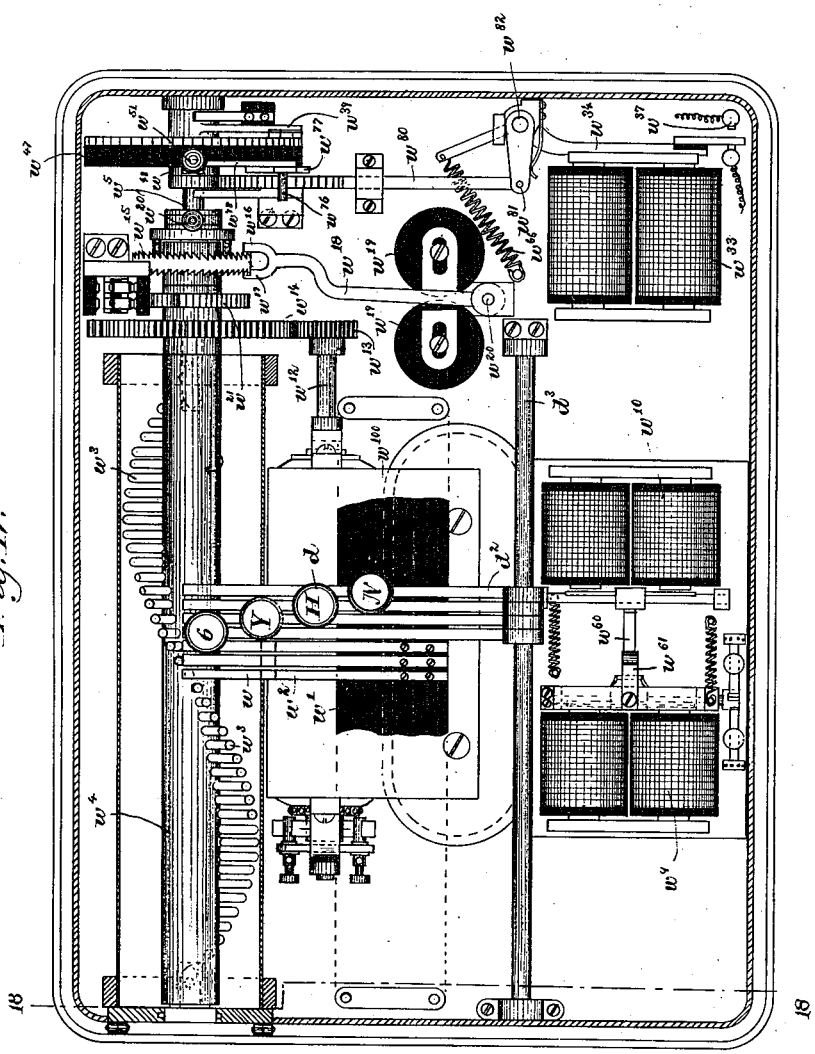

(No Model.) 9 Sheets—Sheet 7.

A. D. NEAL & H. F. EATON.
TYPE WRITING AND PRINTING INSTRUMENT.

No. 486,889. Patented Nov. 29, 1892.

Witnesses,
Henry Westendarp.
S. C. Fearing.

Inventors,
Albert D. Neal &
Howard F. Eaton.
By Jas. H. Churchill
Atty.

(No Model.) 9 Sheets—Sheet 8.
A. D. NEAL & H. F. EATON.
TYPE WRITING AND PRINTING INSTRUMENT.
No. 486,889. Patented Nov. 29, 1892.
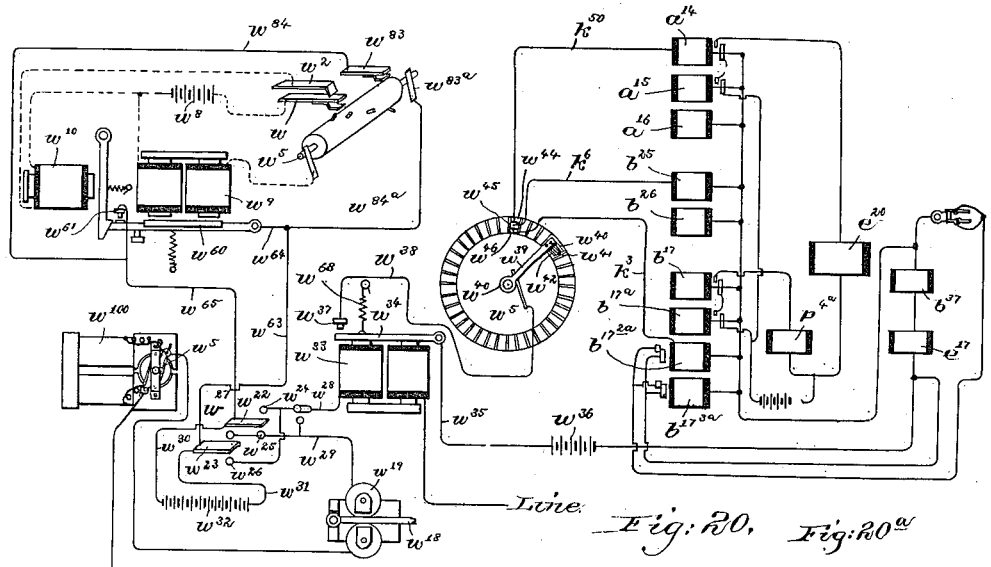
Fig. 20. Fig. 20ᵃ
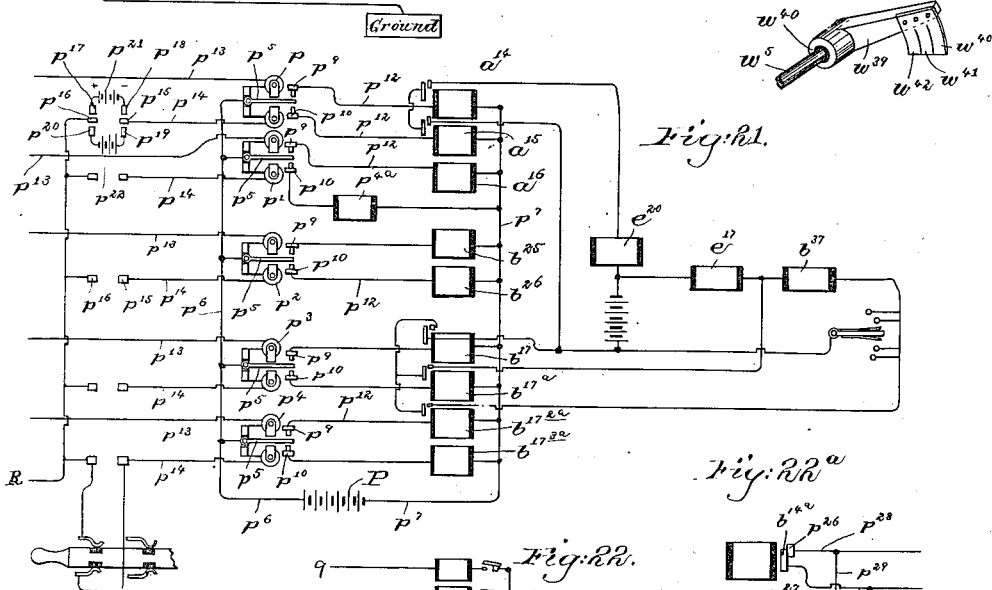
Fig. 21.
Fig. 22ᵃ
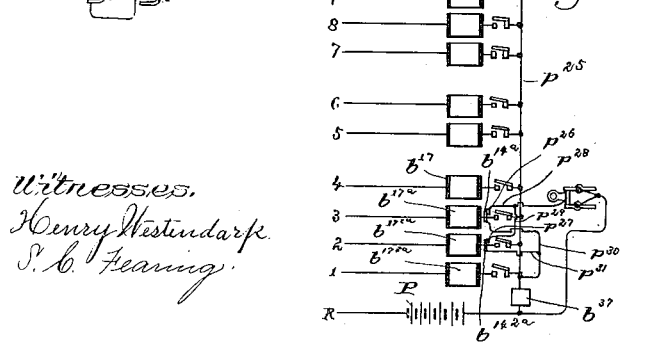
Fig. 22.
Witnesses.
Henry Westendarp.
S. C. Fearing.
Inventors.
Albert D. Neal +
Howard F. Eaton.
By Jas. H. Churchill
Atty.

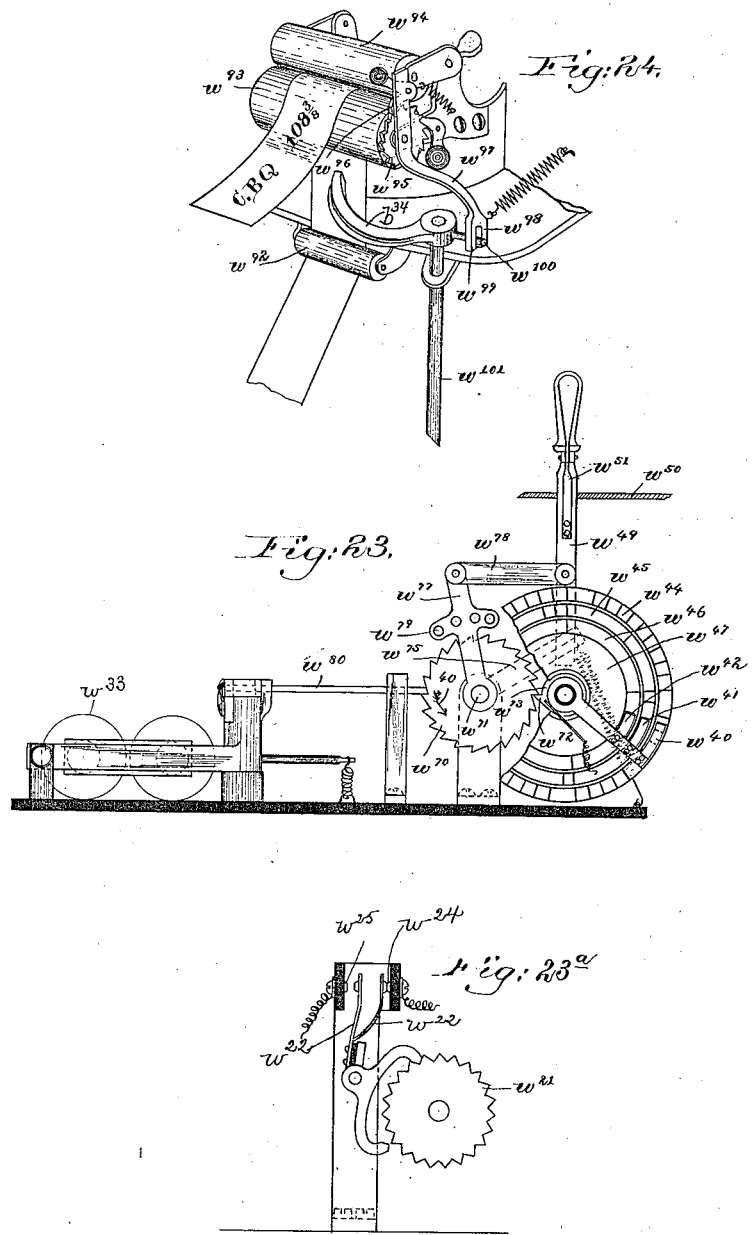

UNITED STATES PATENT OFFICE.

ALBERT D. NEAL, OF BOSTON, AND HOWARD F. EATON, OF QUINCY, MASSACHUSETTS; SAID EATON ASSIGNOR TO SAID NEAL.

TYPE-WRITING AND PRINTING INSTRUMENT.

SPECIFICATION forming part of Letters Patent No. 486,889, dated November 29, 1892.

Application filed June 9, 1891. Serial No. 395,643. (No model.)

*To all whom it may concern:*

Be it known that we, ALBERT D. NEAL, of Boston, county of Suffolk, and HOWARD F. EATON, of Quincy, county of Norfolk, State of Massachusetts, have invented an Improvement in Electro-Mechanical Type-Writing and Printing Instruments, of which the following description, in connection with the accompanying drawings, is a specification, like letters on the drawings representing like parts.

This invention relates to an electro-mechanical type-writing or printing instrument adapted to be used as an electro-mechanical type-writer or printing instrument after the manner of the ordinary mechanical type-writer, or as a transmitter or receiver in a system of type-writer intercommunication.

This invention has for its object to provide a simple, efficient, and substantially-inexpensive electro-mechanical type-writer in which the number of operating parts is reduced to a minimum and which may be used equally as well on a cable or single-wire system of intercommunication or which may be used alone—as, for instance, in office-work.

In accordance with our invention the type-letters or other characters to be printed are arranged on a type-carrier, preferably in a series of horizontal rows, and the said type-carrier is given a substantially horizontal and vertical movement by means of suitable mechanism, as will be described, to place any desired or required letter or character in correct working position with relation to a hammer or striker. The mechanism to actuate the type-carrier is controlled by electro-magnets governed by circuit-controllers, preferably operated by the usual keys of the type-writer, and the operation of the hammer or striker is controlled by an electro-magnet governed by circuit-controllers rendered effective, as will be described.

Prior to our present invention we are aware that electro-mechanical type-writers have been constructed to be used as receiving-instruments, in which each character or letter is secured to a type-carrying lever secured to the armature of an electro-magnet, there being as many electro-magnets as there are characters or letters.

This invention has for its primary object to provide an electro-mechanical type-writer in which the number of electro-magnets required to operate the instrument is reduced to a minimum. In accordance with this feature of our invention the type letters or characters are secured to a type-carrier and are arranged on said carrier in substantially-horizontal and preferably-vertical rows, the number of rows varying with the size of the type-carrier and with the number of characters to be printed. The type-carrier is preferably so arranged with relation to the hammer or striker, and vice versa, that normally one horizontal row of characters is on a horizontal line with the said hammer, and preferably one vertical row of characters is in a vertical line with the said hammer. The row of characters normally in a horizontal line with the hammer we prefer to designate as the "normal horizontal row," and the vertical row of characters in line with the said hammer we prefer to designate as the "normal vertical row." The type-carrier has a movement in a substantially-horizontal path, and preferably, also, a movement in a substantially vertical or axial path, and these movements are effected, as will be described, by suitable mechanism positively operated by electro-magnets governed by suitable circuit-controllers, as will be hereinafter pointed out. The circuit-controllers for the electro-magnets operating the type-carrier are governed by the operation of character-keys, and the operation of a character-key also effects the operation of the printing-magnet—that is, the magnet controlling the operation of the hammer or striker.

The particular features of our invention will be pointed out in the claims at the end of this specification.

Figure 19:
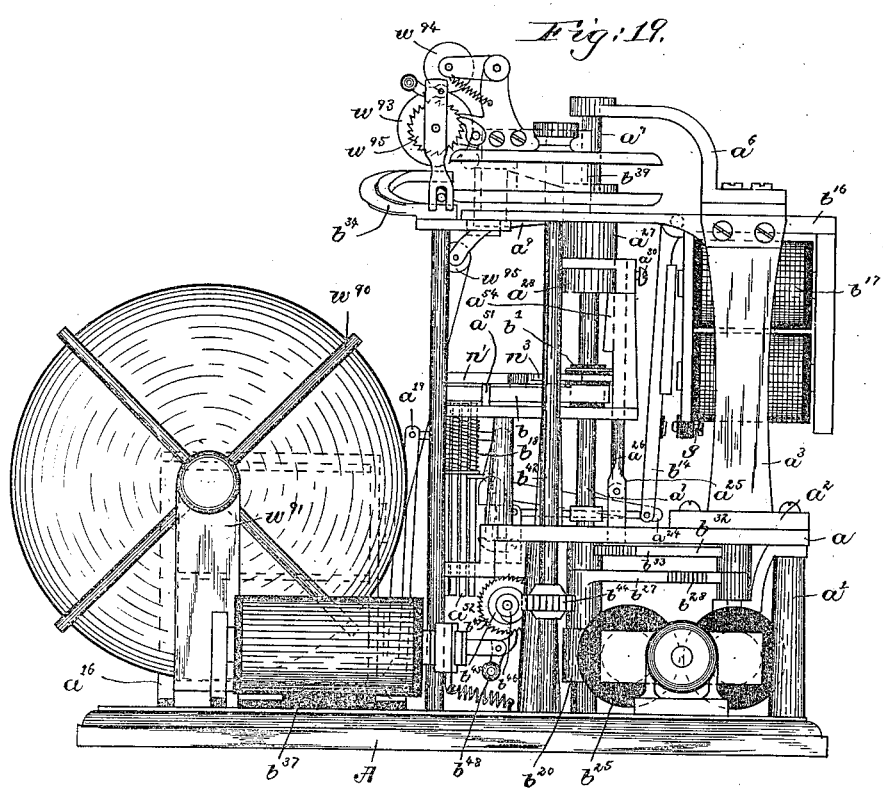

Figure 1 is a top or plan view, partially broken out, of an electro-mechanical type-writer or printing instrument embodying our invention; Fig. 2, a section of the instrument shown in Fig. 1 on the irregular line 2 2; Fig. 3, a detail of the printing-magnet and its hammer, to be referred to; Fig. 4, a rear or end elevation of the instrument shown in Fig. 2, with the base or supporting-frame in section; Fig. 5, a detail to more clearly show the operation of the elevating and pin magnets;

Fig. 6, a detail of the mechanism employed to effect the spacing between the lines; Fig. 7, a detail to be referred to; Fig. 8, a detail of the mechanism employed to revolve the type-carrier; Figs. 9, 10, 10$^a$, and 11, details of the feeding mechanism for the carriage; Fig. 12, a detail of the type-carrier; Fig. 13, a detail to more clearly show the pins or stops for the positioning-arm of the type-carrier; Figs. 14 and 15, details of the circuit-controllers on the positioning-arm; Fig. 16, a diagram of circuits, showing the arrangement of the instrument for the cable system; Fig. 17, a top or plan view partially broken out of the keyboard employed with the instrument when used on the one-wire system; Fig. 18, a section of the keyboard shown in Fig. 17, on line 18 18; Fig. 19, a side elevation of the instrument adapted to be used for transmitting and receiving quotations; Fig. 20, a diagram of circuits to show the operation of the instrument on the one-wire system; Fig. 20$^a$, a detail to be referred to; Fig. 21, a diagram of circuits, showing a modified arrangement for the cable system; Fig. 22, a diagram of circuits to show the manner of connecting the printing-magnet in shunt; Fig. 22$^a$, a detail to be referred to; Fig. 23, a detail in side elevation to more clearly show parts of the keyboard used on the one-wire system; Fig. 23$^a$, a detail of the pole-changer to be referred to, and Fig. 24 a detail of the upper portion of the instrument when used for quotations.

Referring to the drawings, the operating parts of our improved instrument are shown as supported upon a suitable base A, which may be of wood or any other desired material, the said base, as represented in Fig. 2, resting upon a support or table A'. The base A has mounted upon it a supporting-frame, preferably consisting, as herein shown, of a horizontal plate $a$, resting upon posts $a'$, secured to or forming part of the base A, the base-plate $a$ having secured to it, as by screws $a^2$, uprights $a^3$, (herein shown in Fig. 1 as three in number,) the said uprights being connected at their upper ends by a cross-plate or tie-bar $a^4$, preferably cast integral with the said uprights. The outside uprights $a^4$ have secured to them, as herein shown, a bow-shaped piece or yoke $a^5$, extended horizontally toward the center of the instrument, and the cross-plate or tie-bar $a^4$ has secured to or forming part of it an arm $a^6$, extended above and toward the center of the instrument. The arm $a^6$ forms one bearing for a rod, axis, or pivot $a^7$, having its other bearing, as represented in Figs. 2 and 5, in the base A. The pivot or rod $a^7$ has mounted upon it a type-carrier, preferably made as herein shown, it consisting of a circular plate $a^8$, joined by an arm $a^9$ to a hub or sleeve $a^{10}$, fitted upon the pivot or rod $a^7$ to have a vertical movement thereon, as will be described, and the said hub is made fast to the said pivot or rod, so as to revolve therewith, it being, as herein shown, secured to the pivot or rod $a^7$ by a screw or pin $a^{12}$, extended through the sleeve and into a longitudinal groove in the said pivot, (represented by dotted lines $a^{13}$ in Fig. 5.)

The type-carrier has secured to or forming part of it any desired number of letters or characters arranged in preferably horizontal and vertical rows, as represented in Fig. 12. The sleeve $a^{10}$ is moved longitudinally on the type-carrier pivot by means of electro-magnets $a^{14}$ $a^{15}$ $a^{16}$, (see Figs. 4 and 16,) having their armatures $a^{17}$ $a^{18}$ $a^{19}$ operatively connected, as will be described, so as to act upon the said sleeve.

As shown in Fig. 5, each armature of the elevating-magnets is connected by an adjustable rod $a^{20}$ to one arm of a lever $a^{21}$, pivoted, as at $a^{22}$, to a suitable stud or lug $a^{23}$ on the plate $a$ of the supporting-frame and having its other arm $a^{24}$ extended under a yoke $a^{25}$, secured to or forming part of a rod $a^{26}$, herein shown as extended up into an arm $a^{27}$ of a collar or sleeve $a^{28}$, loose on the rod or pivot $a^7$, the rod $a^{26}$, as represented in Fig. 5, being secured to the arm $a^{27}$ by a screw $a^{30}$. The type-carrier rod or pivot $a^7$ has fast on it an arm $b$, preferably electrically disconnected from the said pivot, as herein shown, by a bushing $b'$ of insulating material. The arm $b$ constitutes a horizontal positioning device for the type-carrier and co-operates with a series of stops, herein shown as two stationary bars or uprights $a^{50}$ $a^{51}$, (see Fig. 13,) and intermediate movable pins or rods $a^{52}$. The stationary bars or uprights $a^{50}$ $a^{51}$ are secured to or form part of a plate $a^{53}$, fastened to a stationary arm or post $a^{54}$ of the framework of the instrument. The pins $a^{52}$, as shown in Figs. 5 and 13, are extended up through the plate $a^{53}$. In practice there may be as many stops as there are vertical rows of letters or characters less one—namely, the normal vertical row—and in order to reduce to a minimum the number of magnets required for operating the movable stops or pins we prefer to connect the movable stops or pins in pairs—that is, those pins on opposite sides of the central line or position of the arm $b$ will be connected together by a bridge $b^7$, (see Fig. 7,) having depending from it a rod $b^8$, herein shown as resting upon an arm $b^9$ of a lever $b^{10}$, pivoted in lugs or uprights $b^{12}$ on the plate $a$ of the frame, the said lever being joined, preferably, by an adjustable connection $b^{13}$ to an armature-carrying rod or plate $b^{14}$, pivoted, as at $b^{15}$, to the frame $b^{16}$ of the pin-operating magnets $b^{17}$, &c. The pins $a^{52}$, as represented in Fig. 5, are encircled above the bridge $b^7$ by a spiral spring $b^{18}$, by which the said pins are restored to their normal or lower position when the pin-magnets are demagnetized. By connecting the pins equidistant from the normal or central position of the arm $b$ by means of a bridge $b^7$ both pins are elevated when a pin-magnet is energized, as will be described; but the arm $b$, as herein shown, will be brought in contact with only one of the said pins when the type-carrier pivot is revolved.

The type-carrier pivot $a^7$ may be revolved in opposite directions, as herein shown, to cause the arm $b$ to be brought in contact with a pin or stop on the right or left of the central position preferably by means of a movement - multiplying mechanism, substantially as shown in Fig. 8, wherein the pivot $a^7$ is shown as provided with a sleeve $b^{20}$, herein represented as resting upon a collar $b^{21}$ on the said pivot or rod. The sleeve $b^{20}$ has secured to it an arm $b^{22}$, to the opposite sides of which are secured armatures $b^{23}\,b^{24}$, co-operating with electro-magnets $b^{25}\,b^{26}$, which we prefer to designate as the "shifting-magnets," operating, as herein shown, to produce a horizontal movement of the type-carrier. The multiplying mechanism referred to consists, as herein shown, of a toothed sector $b^{27}$, secured to or forming part of the sleeve $b^{20}$ and in mesh with a smaller toothed sector $b^{28}$ on a rod $b^{29}$, having bearings, as herein shown, in an arm or bracket $b^{30}$ and in the plate $a$, the said arm or bracket being secured to the under side of the said plate. The rod $b^{29}$ has fast on it a toothed sector $b^{32}$ larger than the sector $b^{28}$ and preferably of the same size as the sector $b^{27}$, the sector $b^{32}$ engaging with a smaller sector $b^{33}$, fast on the pivot $a^7$. The toothed sectors herein described form one convenient mechanical means by which the movement of the armature-carrying arm $b^{22}$ may be multiplied, so that a substantially - limited movement of the said armature-carrying arm will produce a substantially - large movement of the type-carrier.

The printing of the characters or letters secured to the type-carrier is effected by means of a hammer or striker $b^{34}$, (see Figs. 2 and 3,) the said hammer being preferably curved or bow-shaped, as herein shown. The hammer $b^{34}$ has secured to or forming part of it a hub $b^{34a}$, loosely mounted on a pin or rod $b^{35}$, forming the pivot for the armature $b^{36}$ of a printing - magnet $b^{37}$, the said hammer, as herein shown, being made fast on the rod or pin $b^{35}$ by a set-screw $b^{38}$. (See Fig. 4.)

Our improved apparatus is provided with the usual inking-ribbon $b^{39}$, (see Fig. 1,) wound upon reels $b^{40}\,b^{41}$, fast upon shafts $b^{42}$, (see Fig. 2,) having bearings, as shown, in the yoke $a^5$ and in the base A of the machine, the said shafts being provided at their lower ends with gears or pinions $b^{44}$, which mesh with worms $b^{45}$ on the opposite ends of a shaft $b^{46}$. The worm-shaft $b^{46}$ has mounted upon it a ratchet-wheel $b^{47}$, engaged by a pawl $b^{48}$, secured to the armature $b^{36}$ of the printing-magnet. The worm-shaft $b^{46}$ is rotated one step or tooth of the ratchet-wheel at each demagnetization of the printing-magnet $b^{37}$, for when the armature $b^{36}$ of the said magnet is attracted the pawl $b^{48}$ is brought into engagement with a new tooth of the ratchet-wheel, and when the said armature is restored to its normal position (shown in Fig. 3) the ratchet - wheel is moved forward the distance of one tooth, thereby rotating the shafts $b^{42}$ of the ink-ribbon-carrying wheels and effecting a gradual feed of the ink-ribbon.

Our improved instrument, as shown in Figs. 2 and 4, is provided with a movable carriage, herein shown as consisting of side pieces $c$ $c'$, connected by front and back pieces $c^2\,c^3$, which rest upon suitable rollers $c^4\,c^5$, having bearings in the stationary part or framework of the machine. The rollers $c^4\,c^5$ are preferably grooved, as herein shown, (see Fig. 2,) to receive the ends of the front and back pieces $c^2\,c^3$. The carriage has secured to its under side a bar $c^6$, provided with ratchet-teeth $c^7$ and gear-teeth $c^8$, the said gear-teeth meshing with a driving-gear $c^9$, rotated by a suitable motor mechanism, herein represented as a spring-actuated drum $c^{10}$, by which the carriage may be restored to its normal position— that is, by which the carriage is moved backward. The forward feed of the carriage is electrically controlled, as will be described. The carriage supports a roll $c^{12}$ of paper to be printed upon, the said roll being mounted on the shaft $c^{120}$, supported in the side pieces $c\,c'$ of the carriage and detachably secured therein, as herein shown, by means of spring-arms $c^{13}\,c^{14}$, the said arms being secured, as by screws $c^{15}$, to the side pieces. The paper roll $c^{12}$ is substantially embraced by the bow-shaped hammer $b^{34}$, which may be readily turned back by first unloosening the set-screw $b^{28}$ to permit the paper roll to be removed. The carriage also supports a paper-feeding mechanism, consisting, as herein shown, (see Fig. 2,) of two hubs or rolls $c^{17}\,c^{18}$, mounted on a shaft $c^{19}$, having bearings in the side pieces of the carriage, and in order that the paper may be automatically fed forward the said shaft has fast on it a ratchet-wheel $c^{20}$, engaged by a pawl $c^{21}$, pivoted on a lever $c^{22}$, loosely mounted on the shaft $c^{19}$. The lever $c^{22}$, as herein shown, (see Figs. 2 and 6,) has an arm $c^{23}$, adapted to be engaged by a cam-block $c^{24}$, provided, as shown, with an inclined face $c^{25}$, upon which the said arm is adapted to rise or travel on the backward movement of the carriage. The cam-block $c^{24}$ is preferably adjustably secured to a plate $c^{26}$, provided with rods $c^{27}\,c^{28}$, extended down into hollow posts or uprights $c^{29}\,c^{30}$, secured to or forming part of the framework of the instrument. The posts $c^{27}\,c^{28}$ are adjustably secured within the hollow posts $c^{29}\,c^{30}$ by screws $c^{31}\,c^{32}$, so that the cam-carrying plate $c^{26}$ may be adjusted to any desired height, to thereby regulate the extent of the travel of the arm $c^{23}$ on the incline or cam $c^{25}$, and thereby regulate the amount of paper fed forward between the lines.

Our improved instrument is provided with a keyboard consisting, as herein shown, of a series of characters-keys $d$, (see Figs. 1 and 2,) there preferably being as many such keys as there are characters or letters on the type-carrier. The character-keys, as herein shown, are provided with stems or rods $d'$, pivotally connected to levers $d^2$, pivoted on rods or shafts $d^3$ within the box or case $d^4$, preferably secured to or forming part of an independent base $d^5$, mounted upon the table A' in close proximity to the base A. Each key-lever controls the operation of one or more circuit-controllers, governing the circuits of the electro-magnets employed in the instrument, as will be described, the number of circuit-controllers operated by each key depending upon the position of the character or letter on the type-carrier corresponding to the particular key, as will be hereinafter pointed out. Each key-lever, as shown in Fig. 2, may be restored to its normal or elevated position after being depressed to effect the printing of any letter or character by a spring $d^{10}$. As shown in Fig. 2, the box or case $d^4$ has located within it a circuit-controlling device D, by means of which each instrument may be transformed from a transmitting apparatus into a receiving apparatus, the said circuit-controlling device, as shown, consisting of a metallic bar $d^{13}$, adapted to slide on insulating guide-rods $d^{14}$ and provided on one surface or face with suitable insulating portions or blocks $d^{16}$, (shown best in Fig. 16,) and with which co-operate contact-pens or terminals $d^{17}$, there being one such terminal or contact-pen for each line-magnet employed in the instrument. The metallic bar $d^{13}$, on its under side is provided with a contact plate or strip $d^{18}$, (see Fig. 16,) electrically disconnected from the bar $d^{13}$ by insulating material $d^{19}$, and the contact strip or plate $d^{18}$ has co-operating with it, as herein shown, two contact-pens or terminals $d^{20}$ $d^{21}$ for a purpose, as will hereinafter be described. As represented in Fig. 16, the instrument is shown as provided with three elevating-magnets, two revolving or shifting magnets, and four pin-magnets, and when composed of this number of magnets the type-carrier may have its letters arranged on it so as to form four horizontal rows and eleven vertical rows, the central vertical row forming the normally-vertical row and the uppermost horizontal line of letters or characters forming the normal horizontal row. When the instrument herein shown is in its normal position, the letter or character in the center of the normal horizontal row is in position to be struck by the hammer $b^{34}$, which may be effected, as will be described.

The teeth $c^7$ of the rack-bar secured to the carriage are engaged, as herein shown, (see Figs. 4 and 10,) by a feeding-pawl $e$ and a holding-pawl $e'$, operated as will be described. The feeding-pawl $e$ is herein shown as a rod beveled at one end to engage the teeth $c^7$ and vertically movable in a guiding-sleeve or hollow arm $e^2$, fast on the rock-shaft $e^3$, the said rod being guided by a pin or projection $e^4$, extended into a groove or grooves in the said sleeve or hollow arm (see dotted lines, Fig. 10) and being normally kept elevated by a spiral spring $e^5$, encircling the said rod. The rock-shaft $e^3$ has secured to it an arm $e^6$, acted upon by a spring $e^7$, to keep the hollow arm or sleeve $e^2$ in its upright position, (shown in Fig. 9,) the spring $e^7$ having one end fastened to a rigid portion of the framework, as at $e^8$, and its other end preferably secured to a drum or pulley $e^9$ on a shaft $e^{10}$, having bearings in the arm $e^6$ and having fast on it a ratchet-wheel $e^{12}$, engaged by a pawl $e^{13}$, pivoted on the arm $e^6$. The tension of the spring $e^7$ may be regulated by rotating the shaft $e^{10}$. The rock-shaft $e^3$ is rotated so as to move the arm $e^2$ in the direction of arrow 20, Fig. 10, to place the pawl $e$ into engagement with a new tooth by a lever $e^{14}$, pivoted, as at $e^{15}$, and having secured to or forming part of it the armature $e^{16}$ of an electro-magnet $e^{17}$, the lever $e^{14}$ preferably acting on a roller $e^{18}$, mounted on the arm $e^6$ of the rock-shaft. When the electro-magnet $e^{17}$ is energized, as will be described, its armature $e^{16}$ is attracted and the lever $e^{14}$ is moved upward in the direction indicated by arrow 21 in Fig. 9. As the lever $e^{14}$ is moved in the direction of arrow 21 it acts on the roller $e^{18}$ and moves the arm $e^6$ in the same direction, thereby rocking the shaft $e^3$ and moving the pawl-carrying arm $e^2$ in the direction of arrow 20 to place the pawl $e$ in engagement with a new tooth on the rack-bar, as shown in Fig. 11. When the magnet $e^{17}$ is demagnetized, the spring $e^7$ acts upon the arm $e^6$ of the rock-shaft and restores the rock-shaft $e^3$ and its pawl-carrying arm $e^2$ back into their normal position, (shown in Fig. 10,) and thereby, through the pawl $e$, moves the rack-bar and the carriage attached to it forward or in the direction indicated by arrow 22, Fig. 10. When the carriage has reached the end of its travel in its forward direction (indicated by arrow 22) it becomes desirous to permit the said carriage to be restored to its normal position by the motor mechanism $c^{10}$, and for this purpose we have provided a releasing device actuated by an electro-magnet $e^{20}$, which we prefer to designate as the "releasing-magnet." The releasing-magnet $e^{20}$ has its armature $e^{31}$ secured to or forming part of an arm $e^{22}$, fast on a shaft $e^{23}$, provided with a crank or arm $e^{24}$, connected by a link $e^{25}$ to a lever $e^{26}$, pivoted at its lower end, as at $e^{27}$, and having pivotally secured to it at its opposite end an arm $e^{28}$, extended through a slot in the pawl-carrying arm $e^2$ and engaging the pin $e^4$ on the pawl $e$. The arm $e^{28}$ is made cam shape on its under side, so that when the said arm is moved forward or in the direction of the arrow 23 the cam-surface of the said arm will depress the guiding-pin $e^4$ of the pawl $e$ and will remove the said pawl from engagement with the tooth of the rack-bar. (See Fig. 10$^a$.) The rock-shaft $e^{23}$ has loosely mounted on it an arm $e^{29}$, constituting a stop for the arm $e^{30}$, carrying the holding-pawl $e'$. The arm $e^{30}$, as herein shown, is provided with a socket, into which the pawl $e'$ is extended, the said pawl resting upon a spiral spring $e^{31}$ within the said socket, which spring acts to keep the holding-pawl $e'$ in engagement with the teeth of the rack-bar. The stop or arm $e^{29}$ has secured to or forming part of it a depending pin $e^{32}$, adapted to be engaged by a stud $e^{33}$ on the arm $e^{24}$.

When the carriage is at rest—as, for instance, when a letter is being printed—the pawls $e$ $e'$ and their actuating parts are in the position shown in Fig. 10, the releasing-magnet $e^{20}$ at such times being demagnetized, and its armature $e^{21}$ occupies the position shown in Fig. 9. If it is desired to return the carriage to its normal position, the circuit of the releasing-magnet is closed, as will be described, and the armature $e^{21}$ is attracted. The attraction of the armature $e^{21}$ rocks the shaft $e^{23}$ and moves the arm or crank $e^{24}$ in the direction indicated by arrow 25, Fig. 10. The stud or projection $e^{33}$ is placed on the crank or arm $e^{24}$ out of contact with the pin $e^{32}$, so that the arm or crank $e^{24}$ may have a substantially-short movement before the stud $e^{33}$ is engaged with the pin $e^{32}$, so that the cam-surface on the arm $e^{28}$, attached to the lever $e^{26}$, may act on the pin $e^4$ and withdraw the feeding-pawl $e$ from engagement with the teeth $c^7$ before the holding-pawl is released. The forward movement of the crank-arm $e^{24}$ causes the stud $e^{33}$ to tip the arm $e^{29}$ downward and out of engagement with the pawl-carrying arm $e^{30}$, (see Fig. 10$^a$,) thus permitting the motor mechanism $c^{10}$ to restore the carriage to its normal or starting position. When the carriage is stopped on its backward movement, the pawl-carrying arm $e^{30}$ is restored to its normal position (shown in Fig. 10) by a spring $e^{30}$.

Referring now to Fig. 16, we have represented in diagram an instrument constructed in accordance with our invention capable of being used as a transmitter, as a receiver, or as an electro-mechanical type-writer for office-work. In Fig. 16 we have represented three elevating electro-magnets $a^{14}$ $a^{15}$ $a^{16}$, two shifting or revolving magnets $b^{25}$ $b^{26}$, and four pin-elevating magnets $b^{17}$ $b^{17a}$ $b^{17\ 2a}$ $b^{17\ 3a}$. Referring now to Fig. 12, we have represented the type-carrier which may be used on the instrument provided with the number of magnets shown in Fig. 16. As represented in Fig. 12, the characters or type-letters are arranged in horizontal and vertical rows, there being four horizontal and eleven vertical rows. When the instrument is not in use, the type-carrier is in its normal position, and at such time the uppermost horizontal row is preferably in line with the hammer or striker, so that, as will readily be seen, an elevating-magnet is not required to operate the type-carrier to place the normally-horizontal row in correct working position with relation to the hammer or striker. The remaining horizontal rows of letters or characters may be brought in correct working position with relation to the hammer by means of the elevating-magnets shown in Fig. 16, and for sake of distinction let it be supposed that the elevating-magnet $a^{14}$ will place the second horizontal row in correct working position, the magnet $a^{15}$ the third horizontal row, and the magnet $a^{16}$ the fourth horizontal row. The extent of the movement of the type-carrier may be controlled by regulating the length of the arm $a^{24}$ of the lever $a^{21}$, connected to the armature of each magnet, as will be readily understood.

As represented in Fig. 12, the central vertical row of characters or letters in the normal position of the type-carrier occupies a position in a vertical line or plane with the hammer or striker, and this vertical row of letters or characters we prefer to designate as the "normal" vertical row. We have represented in Fig. 12 the letter "A" as occupying the central position in the normally-horizontal row and as being the first letter in the normal vertical row, and therefore it will be seen that the shifting and elevating magnets are not required to be operated in order to produce this character or letter, and only the circuit of the printing-magnet need be closed, which may be effected as will be described. The remaining vertical rows on opposite sides of the normal vertical row, excepting the two outside rows, as has already been explained, are coupled in pairs through the instrumentality of the elevating-pins $a^{52}$, so that with the type-carrier shown in Fig. 12 only four pairs of elevating-pins need be used, the stationary stops or pins effecting the printing of the letters or characters in the outside or extreme vertical rows. The operation of the elevating-magnets is governed by one set of circuit-controllers, the operation of the shifting-magnets by another set of circuit-controllers, and the operation of the pin-magnets by still another set of circuit-controllers. The set of circuit-controllers governing the operation of the elevating-magnets may be composed, as shown in Fig. 16, of three contact-pens or movable members $f$ $f'$ $f^2$, co-operating with three circuit-terminals or stationary members $f^3$ $f^4$ $f^5$. The set of circuit-controllers governing the operation of the shifting-magnets may be composed of two contact-pens or movable memers $f^6$ $f^7$ and two co-operating circuit-terminals or stationary members $f^8$ $f^9$, and the set of pin-magnet circuit-controllers may be composed of four movable members or contact-pens $f^{10}$ $f^{12}$ $f^{13}$ $f^{14}$, co-operating with four stationary members or circuit-terminals $f^{15}$ $f^{16}$ $f^{17}$ $f^{18}$. The movable members or contact-pens of the different sets of circuit-controllers referred to are operated by the character-keys of the keyboard, the said contact-pens, as shown in Fig. 2, being secured to the levers $d^2$ and preferably made adjustable with relation to their co-operating circuit-terminals by means of a set-screw $f^{20}$, extended through the lever. The circuit-terminals or stationary members referred to are shown in Figs. 1 and 2 as secured to insulating bars or supports $f^{50}$. Each character-lever has secured to it one or more of the movable terminals, according to the number of magnets required to be operated, to effect the printing of the particular character or letter corresponding to the character-key which has been operated. The printing-magnet $b^{37}$, the feed-magnet $e^{17}$, the releasing-magnet $e^{20}$, and the magnet of the call-bell $p^4$, as shown in Fig. 16, are included in a local circuit provided with a battery $g^5$, and, as represented in said figure, the said local circuit has five normally-open branches. We prefer to close one branch of the local circuit controlling the printing-magnet through the armatures of two pin-magnets $b^{17a}\ b^{17\ 2a}$, as represented in Fig. 16, wherein the armatures $b^{14}\ b^{14a}\ b^{14\ 2a}\ b^{14\ 3a}$ of the pin-magnets $b^{17}\ b^{17a}\ b^{17\ 2a}\ b^{17\ 3a}$ are shown as co-operating with circuit-terminals $g\ g'\ g^2\ g^3$. The armature $b^{14}$, as shown in Fig. 16, is connected by a wire $p$ to the circuit-terminal $g'$, joined by wire $p'$ to the terminal $g^2$, connected by wire $p^2$ to the terminal $g^3$.

The terminal $g$, as represented in Fig. 16, is connected by wire $p^3$ to a magnet operating the call-bell $p^4$, the other end of the magnet-coil being joined by wire $p^5$ to the battery $g^5$.

The armature $b^{14a}$ is connected by a wire $g^4$ to one pole of the battery $g^5$, herein shown as the negative pole, the positive pole being joined by wire $g^6$ to the feed-magnet $e^{17}$, the other end of the coil of the said feed-magnet being connected by wire $g^7$ to the printing-magnet $b^{37}$, connected by wire $g^8$ to the contact brush or pen $n^6$, co-operating with the ring $n^4$, to which the springs or brushes $n^2\ n^3$ are connected, and the arms $n\ n'$, operated by the pins or stops to close the local circuit of the printing-magnet, are connected by the ring $n^{12}$, brush $n^7$, and wire $p^6$ to the negative pole of the battery $g^5$. The armature $b^{14\ 2a}$ is connected by wire $g^9$ to the wire $g^8$. The armature $b^{14\ 3a}$ is connected by wire $p^7$ to the end of the feed-magnet coil, it being shown in Fig. 16 as joined to the wire $g^7$.

As represented in Fig. 16, the pin-magnets $b^{17a}\ b^{17\ 2a}$ control the normally-open branch of the printing and feed magnets, so that when the key-lever corresponding to the letter "A" on the type-carrier is operated the circuit-terminals $f^{12}$ and $f^{13}$ will close the circuits of the pin-magnets $b^{17a}\ b^{17\ 2a}$ to energize the said magnets and attract their armatures $b^{14a}\ b^{14\ 2a}$, and thereby close the local circuit of the printing-magnet $b^{37}$ and feed-magnet $e^{17}$. The contact-pens $f^{12}\ f^{13}$ make contact with the circuit-terminals $f^{16}\ f^{17}$, joined by wires $k\ k'$ to the pin-magnets $b^{17a}\ b^{17\ 2a}$, the said pin-magnets being connected to the line-wires $k^2\ k^3$, which are electrically connected when the instrument is used as an electromechanical type-writer to the negative pole of the battery $e^{190}$ by branch wires $k^{2a}\ k^{3a}$, the conducting strip or bar $o$ of a circuit-controller D', similar in construction to the circuit-controller D, spring $k^{20}$, wire $k^{21}$, spring $d^{20}$, contact-plate $d^{18}$, spring $d^{21}$, and wire $e^{180}$, the positive pole of the battery being connected by wire $e^{200}$ to the circuit-terminals or contact-members $f^{12}\ f^{13}$. When the circuits of the pin-magnets $b^{17a}\ b^{17\ 2a}$ are closed, as described, their armatures $b^{14a}\ b^{14\ 3a}$ are brought into contact with the circuit-terminals $g'\ g^2$, and the local circuit of the printing and feed magnets is closed. This local circuit may be traced as follows, viz: From the positive pole of the battery $g^5$ by wire $g^6$, feed-magnet $e^{17}$, wire $g^7$, printing-magnet $b^{37}$, wires $g^8\ g^9$, armature $b^{14\ 2a}$, terminal $g^2$, wire $p'$, terminal $g'$, armature $b^{14a}$, wire $g^4$ to negative pole of the battery.

The circuit-controller D' may be and preferably is of the same construction as the circuit-controller D, it consisting of the conducting-strip $o$, insulating blocks or pieces $o'$, co-operating springs $o^2$, contact-strip $o^3$, separated from the conducting bar or strip $o$ by insulation $o^4$, and the contact-springs $k^{20}\ k^{200}$. The contact spring $k^{200}$ may be connected by wire $k^{201}$ to the circuit-controller D of another instrument.

To print any letter in the normal horizontal row other than "A," the type-carrier must first be turned to place the desired letter in line with the hammer to be struck thereby, and the circuit of the printing-magnet is then closed, as will be described, to operate the hammer. If the letter to be printed—as, for instance, "B"—is on the left of the character in the normal vertical row, which character is herein shown in Fig. 12 as "A," one of the contact-pens $f^6\ f^7$, operated by the lever $d^2$, corresponding to the character or letter "B," is brought in contact with its co-operating circuit-terminal to close the circuit of that shifting-magnet, which will effect the movement of the type-carrier toward the right, viewing Fig. 12. Let it be supposed that the electro-magnet $b^{25}$ will remove the type-carrier toward the right, viewing Fig. 12. Referring now to Fig. 16, the circuit of the shifting-magnet $b^{25}$ may be traced as follows: From the positive pole of the battery $e^{190}$ by the wire $e^{200}$, contact-pen $f^6$, terminal $f^8$, wire $k^5$ to the shifting-magnet $b^{25}$, line-wire $k^6$, wire $k^{6a}$, circuit-controller D', springs $k^{20}$, wire $k^{21}$, spring $d^{20}$, contact-plate $d^{18}$, spring of circuit-controller D, and wire $e^{180}$ to the negative pole of the battery. As soon as the circuit of the shifting-magnet is closed, as described, the armature $b^{23}$ of the said magnet is attracted and the type-carrier is revolved through the multiplying-gearing $b^{27}\ b^{28}\ b^{32}\ b^{33}$. The movement of the type-carrier referred to is arrested to place the letter "B" in line with the hammer by contact of the positioning-arm $b$ with the stationary pin or stop $a^{51}$, and when the said arm engages the said stop the circuit of the printing-magnet is closed. In order to obtain good electrical connection when the positioning-arm is brought in contact with a stop or pin by the operation of a shifting-magnet, we prefer to pivot upon the said positioning-arm two contact arms or brushes $n\ n'$, (see Fig. 14,) co-operating with two contact pens or brushes $n^2\ n^3$, secured to a metallic band or ring $n^4$ on a sleeve $n^5$ of insulating material mounted on the metallic hub of the positioning-arm. The metallic hub will preferably have mounted on it a ring $n^{12}$ of brass or other good conducting material. The rings or bands $n^4$ $n^{12}$ have co-operating with them brushes $n^6$ $n^7$, the brush $n^6$ being connected to a wire $g^8$ (see Fig. 16) and the brush $n^7$ to a wire $p^6$ to complete the circuit of the printing-magnet, as will be described.

When the positioning-arm strikes the stop $a^{51}$, one of the contact-levers carried by the arm—as, for instance, the contact-lever $n'$—also strikes the pin or stop $a^{51}$ and is brought into contact with its co-operating pen or brush $n^3$, and the local circuit of the printing and feed magnets is closed. This circuit may be traced as follows, viz: From the positive pole of the battery $g^5$ by wire $e^6$, feed-magnet $e^{17}$, wire $g^7$, printing-magnet $b^{37}$, wire $g^8$, contact-brush $n^3$, lever $n'$, ring $n^{12}$, brush $n^7$, wire $p^6$, to negative pole of the battery. It will thus be seen that as soon as the type-carrier has been brought into position to place the letter corresponding to the character or letter key which has been acted upon into line with the hammer or striker, the circuit of the printing-magnet is closed, and the hammer or striker is moved forward to effect the printing of the required letter, and at the same time the feeding mechanism is operated to engage the pawl $e$ with a new tooth of the rack-bar, so that after the printing of the particular character or letter has been effected and the local circuit of the printing and feed magnets has been opened, the spring $e^7$ acts, as above described, to feed the carriage forward.

If it is desired to effect the printing of any letter in the normal horizontal row other than the letter which may occupy the central space in the normal horizontal row (shown in Fig. 12 as occupied by the letter "A") and other than the letters in the outside rows, the circuit of a shifting-magnet and of a pin-magnet is closed, when the character-key corresponding to the letter in the normal horizontal row is depressed, and consequently the said key is made to operate two circuit-controllers or contact-pens. For instance, let it be supposed that it is desired to print the letter "N". In this case the character-key N will operate two circuit-controlling pens or contact-arms $f^6$ $f^{12}$ to close the circuit of the shifting-magnet $b^{25}$ and of the pin-magnet $b^{17a}$. The pin-magnet $b^{17a}$, when energized, as described, attracts its armature and raises a movable pin $a^{52}$ to place it in the path of movement of the positioning-arm $b$ to be struck thereby. When the positioning-arm $b$ strikes the elevated pin, the local circuit of the printing and feed magnets is closed, as described, in connection with the printing of the letter "B." If now it is desired to print any other letter in the normal vertical row on the type-carrier other than the letter "A," the type-carrier must be first elevated and the circuit of the printing-magnet then closed. For instance, let it be supposed that it is desired to print the letter "D" in the second horizontal row. The character-key D will be operated to close the circuit of the elevating-magnet $a^{14}$. When the character-key D is depressed, the contact-pen $f$ is brought into engagement with its circuit-terminal $f^3$, connected by wire $f^{3a}$ to the elevating-magnet $a^{14}$, and the circuit for the said magnet is thus closed, which circuit may be traced as follows, viz: from the positive pole of the battery $e^{190}$ through the line-wire $e^{200}$, contact-pen $f$, terminal $f^3$, wire $f^{3a}$, elevating-magnet $a^{14}$, wires $k^{50}$ $k^{50a}$, circuit-controller $D'$, and thence, as above described, to the negative pole of the battery. The elevating-magnet $a^{14}$ is thus energized and its armature $a^{17}$ is attracted, thereby through the system of levers above described elevating the type-carrier so as to place the second horizontal row of characters or letters in line with the hammer. At the same time the circuit of the elevating-magnet $a^{14}$ is closed by the operation of the character-key D, the local circuit of the printing and feed magnets is also closed, and we prefer to effect the closing of the local circuit referred to through the armatures of two pin-magnets, as above described - viz., the pin-magnets $b^{17a}$ $b^{17\,2a}$, the contact-springs $f^{12}$ $f^{13}$ for the said magnets being secured to or operated by the character-key D.

When the circuits of the pin-magnets $b^{17a}$ $b^{17\,2a}$ are closed, as described, the armatures $b^{14a}$ $b^{14\,2a}$ for the said magnets are attracted and engage with the circuit-terminals $g'$ $g^2$, and close the local circuit for the printing and feed magnets, as above described.

The other letters in the normal vertical row herein shown, as "G" and "J," may be printed in the same manner as the letter "D" by operating the character-keys "G" and "J," which control, respectively, the circuit of the elevating-magnets $a^{15}$ $a^{16}$, and of the two pin-magnets, as $b^{17a}$ $b^{17\,2a}$.

If it is desired to print any letter in the second horizontal row other than the letter "D" in the vertical row and the letters "E" and "F" in the outside rows, the circuit of the elevating-magnet $a^{14}$ is closed and also the circuit of the shifting-magnet, and at the same time the circuit of a pin-magnet is closed to elevate the required pin, so that when the type-carrier has been brought into correct position to place the desired letter on the second horizontal row in line with the hammer the local circuit of the printing-magnet will be effected through the positioning-arm $b$ and one of its attached contact-levers $n$ $n'$.

If it is desired to print any letter in the third horizontal row other than the letter "G" in the vertical row and the letters "H" and "I" in the outside rows, the circuit of the elevating-magnet $a^{15}$ is closed, also the circuit of one of the shifting-magnets and of one of the pin-magnets, as well as the local circuit of the printing-magnet, in a similar manner to that already described.

If a letter in the fourth horizontal row other than the letter "J" in the vertical row and the letters "K" and "L" in the outside rows is to be printed, the circuit of the elevating-magnet $a^{16}$ is closed, as well as that of a shifting-magnet, and also the local circuit of the printing-magnet.

If it is desired to print one of the outside letters in any horizontal row other than the normal horizontal row, the circuit of an elevating-magnet and of a shifting-magnet will be closed and the local circuit of the printing and feed magnets will be closed by one of the stationary pins or stops.

The circuits of the elevating-magnets, the shifting-magnets, and the pin-magnets are controlled by the keys, while the printing and feed magnets are preferably located in a local circuit, as shown in Fig. 16, having normally-open branches, one of which is controlled, preferably, by the armatures of two pin-magnets and another of which is controlled by the positioning-arm co-operating with the stop-pins.

The releasing-magnet $e^{20}$ is included in a branch circuit from the local battery $g^5$, one wire $k^{51}$ of the said branch being joined to a circuit-terminal $k^{52}$, with which co-operates the armature $a^{19}$ of the elevating-magnet $a^{16}$, the other wire $k^{53}$ of the said branch being joined to the armature $a^{18}$ of the elevating-magnet $a^{15}$, the armature $a^{18}$ co-operating with a circuit-terminal $k^{54}$, joined by wire $k^{55}$ to the armature $a^{19}$. The releasing-magnet in practice may be controlled by an independent key operating the contact-pens $f'$ $f^2$ $f^3$. When the independent key referred to is operated, the circuits of two elevating-magnets (shown in Fig. 16 as the magnets $a^{15}$ $a^{16}$) are closed, thereby energizing the said magnets and bringing their armatures into contact with the circuit-terminals $k^{54}$ $k^{52}$ and closing the local circuit of the releasing-magnet, which circuit may be traced as follows, viz: From the positive pole of the battery $g^5$ through the releasing-magnet $e^{20}$, wire $k^{51}$, terminal $k^{52}$, armature $a^{19}$, wire $k^{55}$, terminal $k^{54}$, armature $a^{18}$, and wire $k^{53}$ back to the negative pole of the battery. The feed-magnet $e^{17}$ may be operated independently of the printing-magnet, and this result may be effected, as shown in Fig. 16, by closing a branch of the local battery $g^5$ by two pin-magnets, shown in said figure as the pin-magnets $b^{17a}$ $b^{17\ 3a}$. An independent key on the keyboard is provided with two contact arms or springs $f^{12}$ $f^{14}$, which close the circuits of the pin-magnets $b^{17a}$ $b^{17\ 3a}$, causing them to attract their armatures and close the local circuit of the feed-magnet, which circuit may be traced as follows, viz: from the positive pole of the battery $g^5$ by wire $g^6$, feed-magnet $e^{17}$, wire $p^7$, armature $b^{14\ 3a}$, terminal $g^3$, wires $p^2$ $p'$, terminal $g'$, armature $b^{14a}$, and wire $g^4$ to the negative pole of the battery.

The instrument as thus far described may be used after the manner of the ordinary mechanical type-writer for office-work as an electro-mechanical type-writer, and it is also designed and adapted to be connected in circuit with one or more like instruments for intercommunication, and when thus connected each instrument may be used as a transmitter or as a receiver, and the change from a transmitter to a receiver may be effected by the circuit-controlling device D.

When the instrument is to be used as a transmitter the circuit-controllers D D' are moved so as to place their co-operating-springs in contact with the insulating blocks or pieces of the said circuit-controllers. When in this position, the circuit of any one of the elevating, shifting, and pin-magnets of the transmitting-instrument is closed by its contact-pen when the latter is brought into engagement with its co-operating circuit-terminal, and at the same time the circuit is completed at the receiving-instrument through the elevating, shifting, and pin magnets of said receiving-instrument connected to the elevating, shifting, and pin magnets of the transmitting-instrument which have been energized by the depression of a character-key. The circuit-terminals for the elevating, shifting, and pin magnets of the receiving-instrument are electrically connected to the conducting bar or strip $d^{13}$ of the circuit-controller D for said receiving-instrument, and in this way the circuit-terminals of the said receiving-instrument are connected to the negative pole of the battery $e^{190}$ by the common return for the battery $e^{190}$, which common return is partially represented in Fig. 16 by the wires $k^{21}$ $e^{180}$, the positive pole of the battery $e^{190}$ being connected by wire $e^{200}$ to the contact-pens of the transmitting-instrument. As represented in Fig. 16, each elevating, shifting, and pin magnet is connected by a line-wire to a corresponding elevating, shifting, and pin magnet of another instrument, and when thus connected the instruments are working on what may be termed as the "cable system."

The cable system may be advantageously employed for short distances; but for long distances we prefer to employ what may be termed the "one-wire system."

When the electro-mechanical type-writer is to be used on a one-wire system—that is, where two or more instruments are connected by a single wire—a keyboard, substantially such as shown in Figs. 17 and 18, is used, and in practice the said keyboard may be substituted for the keyboard shown in Fig. 2. In the keyboard shown in Figs. 17 and 18 the key-levers $d^2$ are adapted to operate contact-arms or circuit-terminals $w$, secured to an insulating-block $w'$, each contact-arm constituting one member of a normally-closed circuit-controller and also one member of a normally-open circuit-controller. The co-operating member for the normally-closed circuit-controller is shown as a spring-arm $w^2$, secured to the insulating-block $w'$, and the co-operating member of the normally-open circuit-controller is shown as a metallic pin, stud, or projection $w^3$, extended through an insulating-roll $w^4$, mounted on a conducting-shaft $w^5$, having bearings in suitable uprights or supports secured to the base $w^7$. The shaft $w^5$ and the contact-pins $w^3$ form one terminal of a normally-open local circuit, the co-operating terminal of which is the contact arm or spring $w$. The local circuit referred to includes within it a battery $w^8$ and an electro-magnet $w^9$. The battery $w^8$, as represented in Fig. 20, is also included in a normally-closed circuit having in it an electro-magnet $w^{10}$, the contact-arms $w\ w^2$ forming the terminals for the said normally-closed circuit. The circuit-terminal-carrying surface or roll $w^4$ is used both in a transmitting and in a receiving instrument, and when used on a transmitting-instrument the roll may be and preferably is rotated continuously, or substantially so, by means of an electric motor $w^{100}$, having its armature-shaft $w^{12}$, provided with a pinion $w^{13}$, (see Fig. 17,) in mesh with a gear $w^{14}$ on the roller-shaft $w^5$; but when the roll $w^4$ is used on a receiving-instrument the said roll is rotated step by step by means of an escape wheel or gear $w^{15}$, keyed on the shaft $w^5$ and engaged by pallets $w^{16}\ w^{17}$ on a pallet-bar $w^{18}$, forming part of the armature of a polarized electro-magnet $w^{19}$, the said pallet-bar, as shown in Fig. 17, being pivoted, as at $w^{20}$, to an upright supported by the base $w^7$. The escapement-wheel $w^{15}$ is constructed in any suitable manner to engage the roll $w^4$ and to be disengaged therefrom. The disengagement may be effected as represented in Fig. 17 by means of a handle or clutch-bar $w^{200}$. The shaft $w^5$ of the roller $w^4$ also has mounted on it, as shown in Fig. 17, a ratchet or escape wheel $w^{21}$, to operate a pole-changer consisting, as herein shown, (see Fig. 20,) of two arms $w^{22}\ w^{23}$, co-operating with two sets of contacts $w^{24}\ w^{25}\ w^{26}\ w^{27}$, the contacts $w^{24}\ w^{26}$ being of like polarity and connected to one side $w^{28}$ of the line, and the contacts $w^{25}\ w^{27}$ being of like polarity and connected to the other side $w^{29}$ of the line. Each member $w^{22}\ w^{23}$ is preferably composed of two arms electrically connected together, (see Fig. 23$^a$,) but which are represented in Fig. 20 as a single piece. The pole-changing members or arms $w^{22}\ w^{23}$ are joined by wires $w^{30}$ $w^{31}$ to opposite poles of the battery $w^{32}$, herein shown in Fig. 20 as to the negative and positive poles of the said battery. The main line $w^{38}$ includes in it an electro-magnet $w^{33}$, having its armature $w^{34}$ connected, as shown in Fig. 20, by wire $w^{35}$ to one pole of a local battery $w^{36}$, the said armature forming one member of a normally-open circuit-controller for the said local battery, the other member of which is a back-stop $w^{37}$, connected by wire $w^{38}$ to a selecting-arm $w^{39}$ fast on the shaft $w^5$, but electrically separated therefrom by insulation $w^{40}$. The selecting-arm $w^{39}$ co-operates with a series of circuit-terminals, as will be described, to which the electro-magnets of the instrument are connected, substantially as described in another application, Serial No. 389,369, filed by us April 17, 1891. The selecting-arm $w^{39}$, as shown in Figs. 20 and 20$^a$, is provided with three contact pens or brushes $w^{10}\ w^{41}\ w^{42}$, which co-operate, as shown in said figures, with three independent circuit-terminals $w^{44}\ w^{45}\ w^{46}$. The circuit-terminals $w^{44}\ w^{45}\ w^{46}$ are preferably secured to the face of an insulating support or disk $w^{47}$, (see Figs. 17 and 23,) mounted on a hub or sleeve $w^{48}$, loose on the roller-shaft $w^5$, the said disk, as represented in Fig. 23, being held stationary or in a fixed position by means of an arm $w^{49}$, extended from the disk through the cover $w^{50}$ for the keyboard, the said arm having secured to it a locking device shown as a handle $w^{51}$, adapted to engage one of a series of notches in the said cover. The circuit-terminals $w^{44}\ w^{45}\ w^{46}$ are arranged on the disk, preferably in concentric circles, as represented in Fig. 23, and the number of circuit-terminals required to produce any particular letter or character will preferably be arranged in radial lines. Referring to Fig. 20, the elevating-magnet $a^{14}$ is connected by its wire $k^{50}$ to the terminal $w^{44}$, the shifting-magnet $b^{25}$ by its wire $k^6$ to the terminal $w^{45}$, and the pin-magnet $b^{17\ 2a}$ by its wire $k^3$ to the terminal $w^{46}$. When the contact-brushes $w^{40}$ $w^{41}\ w^{42}$ on the selecting-arm $w^{39}$ are in contact with the circuit-terminals $w^{44}\ w^{45}\ w^{46}$ and the local circuit of the battery $w^{36}$ is closed by the armature $w^{34}$ of the electro-magnet $w^{33}$, which may be effected as will be described, the elevating-magnet $a^{14}$, the shifting-magnet $b^{25}$, and the pin-magnet $b^{17\ 2a}$ will be energized, and a letter, viewing Fig. 12, in the second horizontal row, at the left of the normal vertical row and in the third vertical row from the normal row will be printed. This letter is shown in Fig. 12 as "P." The circuit-terminal pins or studs $w^3$ are arranged spirally around the movable roller or surface $w^4$, and each pin or stud has co-operating with it a terminal pen or brush $w$, there being one such terminal pen and stud for each character-key on the keyboard. The number of circuit-terminals $w^{44}\ w^{45}\ w^{46}$, arranged in a radial line on the disk $w^{47}$, depends upon the number of magnets required to be energized to effect the printing of any particular character.

When the instrument is used as a transmitter, the printing of any particular letter or character is effected, as shown in Fig. 18, by depressing a key-lever, and through the instrumentality of the arm $w^{55}$, secured to the said lever, depressing the terminal pen $w$ and bringing it into the path of movement of a terminal stud or pin $w^3$, so that when in the revolution of the roll $w^4$ the terminal pin or stud strikes the pen $w$ the circuit of the magnet $w^9$ is closed. When the circuit of the magnet $w^9$ is closed, as described, the armature $w^{60}$ of the said magnet is attracted and brought in contact with its back-stop $w^{61}$, thereby closing a short circuit for the main-line battery $w^{32}$, which short circuit may be traced in Fig. 20 as follows, viz: from the positive pole of the battery $w^{32}$ by wires $w^{31}$ $w^{63}$ to wire $w^{64}$, thence to the armature $w^{60}$, back-stop $w^{61}$, wires $w^{65}$ $w^{30}$ to the negative pole of the battery $w^{32}$. The short-circuiting of the main-line battery is equivalent to breaking the main line, and consequently the electro-magnet $w^{33}$ is demagnetized to such an extent as to permit the spring $w^{66}$ to withdraw the armature $w^{34}$ and bring it into engagement with its back-stop $w^{37}$, thereby closing the circuit of the local battery $w^{36}$ at that point. The local circuit of the battery $w^{36}$ is also closed at the selecting-arm $w^{39}$, and those magnets of the instrument will be energized which are connected to the circuit-terminals on the disk $w^{47}$, with which the contact-pens of the selecting-arm are in contact. When the instrument is used as a receiver, the circuit-terminal-carrying roll $w^4$ of the receiving-instrument is rotated step by step by means of the polarized electro-magnet $w^{19}$ operating the escapement-wheel $w^{15}$ through its pallet-bar $w^{18}$ and when the main line is short circuited or practically broken at the transmitting-instrument, as above described, the electro-magnet $w^{33}$ of the receiving-instrument is demagnetized, and the circuit of the local battery $w^{36}$ of the receiving-instrument is closed by the armature $w^{34}$ being brought in contact with the back-stop $w^{37}$. In this manner the character or letter of the receiving-instrument corresponding to the character or letter of the transmitting-instrument is printed. The instrument is provided with a unison device, by means of which the circuit-terminal-carrying rolls $w$ of the transmitting and receiving instruments may be rotated in unison. The unison device herein shown consists of a ratchet-wheel $w^{70}$ (see Fig. 23) loose on a stud or arbor $w^{71}$ and engaged by a pawl $w^{72}$, secured to the roller-shaft $w^5$, the said pawl being shown as a part of a collar $w^{73}$ fast on the shaft $w^5$. The ratchet-wheel $w^{70}$ is provided with an arm or projection $w^{75}$, adapted to be brought into engagement with a pin or stud $w^{76}$ on an arm or lever $w^{77}$, loose on the shaft or arbor $w^{71}$ and connected by a link $w^{78}$ to the arm or handle $w^{49}$. The pin $w^{76}$ is preferably adjustably secured to the arm $w^{77}$, it being herein shown as inserted into one of a series of holes $w^{79}$ in the said arm.

The operation of the unison device is as follows, viz: The ratchet-wheel $w^{70}$ is moved in the direction indicated by arrow 40 one tooth at each revolution of the roller-shaft $w^5$ by the pawl $w^{72}$ until the arm $w^{75}$ engages the pin or stud $w^{76}$, which stops the rotation of the roller-shaft $w^5$. The ratchet-wheel $w^{70}$ is engaged by a holding-pawl $w^{80}$, (shown in Fig. 23 as a bar,) guided in a suitable upright and pivotally connected, as shown in Fig. 17, to a crank or arm $w^{81}$ on a stud or pin $w^{82}$ secured to, preferably, the armature $w^{34}$ of the electro-magnet $w^{33}$. The magnet $w^{33}$ in practice may be short-circuited by an independent key, which we prefer to designate as the "unison-key," and which in practice acts on an independent contact arm or terminal $w^{83}$ cooperating with a terminal stud or pin $w^3$ on the roller $w^4$. The contact-arm $w^{83}$, as shown in Fig. 20, is joined by wire $w^{84}$ to the wire $w^{65}$, and the shaft $w^5$ is electrically connected to the battery $w^{32}$ by the brush $w^{83a}$ and wires $w^{84a}$ $w^{63}$. The unison short circuit for the battery $w^{32}$ may be traced as follows, viz: from the positive pole of the battery $w^{32}$ by wires $w^{31}$ $w^{63}$ $w^{84a}$ and brush $w^{83a}$ to the shaft $w^5$, thence by terminal stud or pin $w^3$, contact-arm or terminal $w^{83}$, wires $w^{84}$ $w^{65}$ $w^{30}$ to the negative pole of the battery. The position of the unison stop or pin $w^{76}$ with relation to the unison-arm $w^{75}$ may be varied as desired by adjusting the said pin or stop in the holes $w^{79}$ to enable the roll $w^4$ to be revolved any desired number of times before being stopped by the unison.

The electro-mechanical printing-instrument has thus far been described as an electro-mechanical type-writer to produce the usual characters and letters employed on the ordinary mechanical type-writer; but we do not desire to limit ourselves to this specific use of the instrument, as it can be used for other purposes. For instance, the instrument may be used to print stock or other quotations after the manner of the ordinary stock-ticker. Fig. 19 shows the instrument as adapted to be used for printing stock and like quotations. The construction of the instrument shown in Fig. 19 is the same as that of the instrument shown in Fig. 2, with the exception that in the instrument shown in Fig. 19 the carriage is omitted and the hammer set substantially at a right angle to the position shown in Fig. 2.

In the instrument shown in Fig. 19 the roll of paper of substantially small width, as shown in Fig. 24, is wound upon a reel $w^{90}$, mounted on a shaft having bearings in uprights $w^{91}$, the said paper, as herein shown, being carried upward behind guide-rolls $w^{95}$ and between a feed-roll $w^{93}$ and presser-roll $w^{94}$. The feed-roll $w^{93}$ is rotated one tooth of a ratchet-wheel $w^{95}$, fast on the shaft of the said roller by a push-pawl $w^{96}$, pivoted on a lever $w^{97}$, loosely mounted on the shaft of the said feed-roller and provided at its opposite end with forks $w^{98}$ $w^{99}$, embracing a pin or stud $w^{100}$, secured to the hammer. The hammer, as shown in Figs. 19 and 24, lies in a substantially horizontal plane, and is fast on a rock-shaft $w^{101}$, having bearings in the framework of the instrument, and at or near its lower end the said hammer has secured to it the armature $b^{36}$ of the printing-magnet. In operation the hammer is moved forward against the paper when the armature of the printing-magnet is attracted, and at each forward movement of the hammer the pin or stud $w^{100}$ engages the fork $w^{99}$ and turns the lever $w^{97}$ so as to engage the push-pawl $w^{96}$ with a new tooth of the ratchet, and on the backward movement of the hammer, caused by the withdrawal of the armature from the printing-magnet, the pin or stud $w^{100}$ engages the other fork $w^{98}$ and turns the lever so as to push the pawl $w^{96}$ forward and thereby rotate the feed-roll to present a new or clean surface of paper to be printed upon. The positioning of the type-carrier with relation to the hammer by the electro-magnets of the instrument and the closing of the local circuit containing the printing-magnet are effected in precisely the same manner and by the same means, as already described, with relation to the instrument used as an electro-mechanical type-writer.

As shown in Fig. 16, the elevating, shifting, and pin magnets of one instrument are connected to like magnets of a second instrument by independent line-wires in the cable system. In order that the cable system may be employed and at the same time the number of line-wires in the cable may be reduced, the construction and arrangement shown in Fig. 21 may be employed. In the arrangement shown in Fig. 21, the magnets of the instruments are included in a local circuit provided with a battery P, and having normally-open branches, as will be described, controlled by polarized electro-magnets or relays $p$ $p'$ $p^2$ $p^3$ $p^4$. The armatures $p^5$ of all the polarized magnets are connected to one pole of the line-battery, shown as the positive pole by the wire $p^6$, and the other or negative pole of the battery P is connected by wire $p^7$ to the magnets of the instrument. The armature $p^5$ of each polarized electro-magnet co-operates with two contact-points or terminals $p^9$ $p^{10}$, to each of which is connected by a wire $p^{12}$ a magnet of the instrument. As represented in Fig. 21, the magnet of the call-bell is connected to one of the terminals or contact-points $p^{10}$ and to the wire $p^7$. It will thus be seen that when the armature of one of the polarized electro-magnets—as, for instance, the armature $p^5$ of the polarized magnet $p$—is brought in contact with one contact stop or terminal, as $p^9$, the circuit of the local battery P is closed through the elevating-magnet $a^{14}$, and when the said armature is brought in contact with the terminal $p^{10}$, the local circuit is completed through the elevating-magnet $a^{15}$. The polarized electro-magnets $p$ $p'$, &c., are energized through the instrumentality of the character-controlling keys, as will be described. One coil of each polarized electro-magnet has connected to it a line-wire $p^{13}$ and the other coil of the said electro-magnet is joined by a wire $p^{14}$ to a common return-wire R. The wire $p^{14}$ connected to each polarized electro-magnet is normally open and is provided with contact terminals $p^{15}$ $p^{16}$, with which co-operate two sets of circuit-terminals or contact members $p^{17}$ $p^{18}$ $p^{19}$ $p^{20}$, connected, as represented in Fig. 21, by suitable wires to batteries $p^{21}$ $p^{22}$, the circuit-terminals or contact members $p^{17}$ $p^{18}$ being connected, as shown in Fig. 21, to the positive and negative poles of the battery $p^{21}$, and the circuit-terminals $p^{19}$ $p^{20}$ being connected to the positive and negative poles of the battery $p^{22}$. The circuit-terminals or contact members $p^{17}$ $p^{18}$ in practice are operated by one character-lever, which, for sake of illustration, may be supposed to be the lever of the letter "E," and the circuit-terminals $p^{19}$ $p^{20}$ are operated by the lever of another and different character or letter, which may be supposed to be the letter "H." When the character-key "E" is operated, the circuit-terminals $p^{17}$ $p^{18}$ are brought into engagement with the terminals $p^{16}$ $p^{15}$ and the current from the battery $p^{21}$ flows over the line in one direction and passes through the polarized electro-magnet $p$ in one direction and attracts the armature and brings it into contact with the terminal $p^9$, thereby closing the circuit of the local battery P through the elevating-magnet $a^{14}$. When the character-key "H" is operated, the positive and negative poles of the battery $p^{22}$ are brought into contact with the circuit-terminals $p^{15}$ $p^{16}$ and the current from the battery $p^{22}$ flows over the line in the reverse direction, and, passing through the polarized electro-magnet $p$, will cause the armature $p^5$ to be brought into engagement with the contact-point or terminal $p^{10}$, and thus close the circuit of the local battery P through the elevating-magnet $a^{15}$. We have represented the two sets of circuit-terminals $p^{17}$ $p^{18}$ $p^{19}$ $p^{20}$ as connected to two independent batteries $p^{21}$ $p^{22}$ merely to enable the operation to be clearly understood; but in practice the said sets of circuit-terminals will preferably be connected to the opposite poles of the same battery after the manner of an ordinary pole-changer. The elevating-magnet $a^{16}$ and the call-bell magnet are represented in Fig. 21 as controlled by the polarized electro-magnet $p'$, the two shifting-magnets $b^{25}$ $b^{26}$ by the magnet $p^2$, and the pin-magnets $b^{17}$ $b^{17a}$ $b^{17\,2a}$ $b^{17\,3a}$ by the polar-magnets $p^3 p^4$. The lever of each character or key in practice may operate any number of sets of circuit-terminals required to energize the polarized electro-magnets necessary to operate the different electro-magnets of the instruments required to effect the printing of any desired character or letter. In Fig. 16 the printing-magnet $b^{37}$ is shown as included in a local circuit provided with two normally-open branches, one being controlled by the armatures $b^{14a}$ $b^{14\,2a}$ of the pin-magnets $b^{17a}$ $b^{17\,2a}$ and the other being controlled by the positioning-arm $b$; but we do not desire to limit ourselves in this respect, as the printing-magnet may be included in a local circuit having two normally-closed branches.

Referring to Fig. 22, the printing-magnet $b^{37}$ is in a normally-closed shunt-circuit, it being connected to the common return-wire R and to the wire $p^{25}$, corresponding to the wire $e^{200}$ in Fig. 16. When the printing-magnet $b^{37}$ is included in a shunt-circuit, the circuit is normally closed at the positioning-arm $b$, as represented in Fig. 22, and also at the armatures $b^{14a}$ $b^{14\,2a}$ of the pin-magnets $b^{17a}$ $b^{17\ 2a}$, the said armatures co-operating with back-stops $p^{26}\ p^{27}$, the said back-stops, as represented in Figs. 22$^a$ being connected by wires $p^{28}\ p^{29}$ to one side of the line and the armatures $b^{14a}\ b^{14\ 2a}$ being joined by wires $p^{30}\ p^{31}$ to the other side of the line. The printing-magnet $b^{37}$, as represented in Fig. 22, is shunted, and remains inoperative until the circuit is broken either by the energizing of the two pin-magnets $b^{17a}\ b^{17\ 2a}$, or by the movement of the positioning-arm $b$, and when the circuit is opened, as described, the current then passes through the printing-magnet and energizes the same, thereby effecting the printing of a character or letter. In practice a series of instruments may be connected together and any one of the series may be used as a transmitter and all the other instruments on the circuit may be used as receivers. In many instances it may be desired to establish private communication between two or more instruments to the exclusion of the other instruments on the circuit, so that a message transmitted from one instrument may be received by one or more of the other instruments connected in circuit to the exclusion of the remaining instruments on the circuit. When the instruments are connected together on what is known as the "cable system," this result may be obtained by means of combination or individualizing switches, substantially as shown and described in another application, Serial No. 389,869, filed by us April 21, 1891, or by effecting a rearrangement of the line-wires, so that when one letter-key of the transmitting-instrument is operated the same letter will be printed on the instruments properly connected to the transmitting-instrument and a different letter will be printed on the receiving-instruments not properly connected. In this way private communication may be established between any two instruments in a circuit containing a series of instruments. This result may be effected on the one-wire system by removing the roll $w^4$ employed for general work and substituting therefor another roll having its pins or circuit-terminals $w^3$ arranged in a different manner from those on the roll used for general work. When the new roll $w^4$ has been placed in position on the machine, the circuit-terminal-carrying disk $w^{47}$ is moved so as to bring the circuit-terminals thereon into position to correspond with the arrangement of the pins or circuit-terminals on the roll $w^4$.

We claim—

1. In an electro-mechanical type-writing instrument, the combination of the following instrumentalities, viz: a shaft or pivot, a movable type-carrier mounted on said shaft to revolve therewith and to slide thereon, an electro-magnet to positively revolve the type-carrier in one plane or direction, a second electro-magnet to effect a sliding movement of the type-carrier on its shaft or pivot and thereby move the said type-carrier in a different plane or direction, and circuit-controllers to govern the operation of the said magnets, substantially as described.

2. In an electro-mechanical type-writing instrument, the combination of the following instrumentalities, viz: a movable type-carrier, an electro-magnet to effect its movement in one direction, a second electro-magnet to effect its movement in another direction, an electro-magnet to control the duration of the movement in one direction, and circuit-controllers to govern the operation of the said magnets, substantially as described.

3. In an electro-mechanical type-writing instrument, the combination of the following instrumentalities, viz: a type-carrier having an axial and pivotal movement, an electro-magnet to positively effect its axial movement, a second electro-magnet to effect its pivotal movement, a hammer or striker, an electro-magnet to operate it to effect the printing of a letter or character, circuit-controllers rendered operative by the manipulation of character-keys to operate the electro-magnets governing the movement of the type-carrier, and independent circuit-controllers to govern the operation of the printing-magnet, substantially as described.

4. In an electro-mechanical type-writing instrument, the combination of the following instrumentalities, viz: a type-carrier provided with a plurality of letters or characters, an electro-magnet to move it in one plane or direction, a second electro-magnet to positively move it in a different plane or direction at an angle to the first plane or direction, a positioning-arm connected to the type-carrier to move therewith, a series of movable stops to co-operate with said positioning-arm, one or more electro-magnets to operate said stops, and circuit-controllers for said electro-magnets, substantially as described.

5. In an electro-mechanical type-writing instrument, the combination of the following instrumentalities, viz: a revoluble type-carrier provided with a plurality of characters, a positioning-arm secured to said carrier to revolve therewith, movable stops connected in pairs to co-operate with the said arm, electro-magnets to operate said stops, an electro-magnet to revolve said type-carrier, and circuit-controllers to govern the operation of the electro-magnets, substantially as described.

6. In an electro-mechanical type-writer, the combination of the following instrumentalities, viz: a type-carrier provided with a plurality of letters or characters, an electro-magnet to move it in one direction, an electro-magnet to move it in another direction, a positioning arm or device movable with the type-carrier, movable stops or pins connected in pairs, electro-magnets to operate said movable stops or pins, a hammer or striker, an electro-magnet to operate it, and circuit-controllers to govern the operation of the electro-magnets, substantially as described.

7. In an electro-mechanical type-writer, the combination of the following instrumentalities, viz: a type-carrier provided with a plurality of letters or characters, an electro-magnet to move it in one direction, a second electro-magnet to move it in another direction, gearing to produce a multiplied movement of the type-carrier, a striker or hammer, an electro-magnet to operate the said hammer or striker, and circuit-controllers to govern the operation of the electro-magnets, substantially as described.

8. In an electro-mechanical type-writer, the combination of the following instrumentalities, viz: a type-carrier provided with a plurality of letters or characters, an electro-magnet to move the type-carrier in one direction, a second electro-magnet to move the type-carrier in another direction, and an electro-magnet to govern the movement of the type-carrier in the second direction, a movable carriage, an electro-magnet to effect movement of the carriage in one direction, means to move it in the opposite direction, a paper-roll on said carriage, a feed-roll on the carriage, means to effect the movement of the feed-roll on the movement of the carriage in one direction, and circuit-controllers governing the operation of the electro-magnets, substantially as described.

9. In an electro-mechanical type-writer, the combination of the following instrumentalities, viz: a type-carrier having a movement in different directions, independent electro-magnets to positively effect the movement of the type-carrier in each of the said different directions, circuit-terminals to which the electro-magnets are connected, character-keys, and a plurality of circuit-controllers positively operated by each character-key and co-operating with the said circuit-terminals to govern the operation of the independent electro-magnets, substantially as described.

10. In an electro-mechanical type-writer, the combination of the following instrumentalities, viz: a type-carrier provided with a plurality of characters, a positioning arm or device movable with the said type-carrier, a stop for said positioning-arm, and a printing-magnet operated by the said arm and stop, substantially as described.

11. In an electro-mechanical type-writer, the combination of the following instrumentalities, viz: a type-carrier provided with a plurality of characters arranged in substantially horizontal and vertical rows, an electro-magnet to move the type-carrier in one direction, a second electro-magnet to move it in another direction, a positioning device or arm movable with the type-carrier, movable stops or pins to engage said positioning device or arm, independent electro-magnets to operate said stops or pins, circuit-controllers for said electro-magnets, a hammer or striker, and an electro-magnet to operate it, governed in its operation by the said stops and arms, substantially as described.

12. In an electro-mechanical type-writer, the combination of the following instrumentalities, viz: a type-carrier provided with a plurality of characters and movable in two different planes, an electro-magnet to positively move the said type-carrier in one plane, a second electro-magnet to positively move the said type-carrier in a different plane, character-keys, and a plurality of independent circuit-controllers operated by each of the said character-keys to effect the operation of the independent electro-magnets, substantially as described.

13. In an electro-mechanical type-writer, the combination of the following instrumentalities, viz: a type-carrier shaft or pivot, a type-carrier longitudinally movable on said shaft, a positioning-arm secured to said shaft or pivot, an electro-magnet to move the type-carrier longitudinally on its pivot or shaft, a second electro-magnet to positively revolve said pivot and type-carrier, circuit-controllers for said electro-magnets, a hammer or striker, and an electro-magnet to operate it, substantially as described.

14. In an electro-mechanical type-writer, the combination of the following instrumentalities, viz: a type-carrier shaft or pivot, a type-carrier longitudinally movable on said shaft and provided with a plurality of characters arranged in substantially horizontal and vertical rows, a positioning arm or device secured to said pivot to move therewith, a series of electro-magnets to move the type-carrier different distances longitudinally on its pivot, an electro-magnet to positively revolve said pivot and its type-carrier, movable stops to co-operate with the positioning arm or device, a plurality of electro-magnets to operate said movable stops, circuit-controllers to govern the operation of the said electro-magnets, a hammer or striker, and an electro-magnet to operate it, substantially as described.

15. In an electro-mechanical type-writer, the combination of the following instrumentalities, viz: a type-carrier shaft or pivot, a type-carrier longitudinally movable on said shaft and provided with a plurality of characters arranged in substantially horizontal and vertical rows, a positioning arm or device secured to said pivot to move therewith, a series of electro-magnets to move the type-carrier longitudinally on its pivot, electro-magnets to revolve the type-carrier pivot in opposite directions, movable stops or pins connected in pairs, a plurality of electro-magnets to operate said stops or pins, circuit-controllers to govern the operation of the said electro-magnets, a hammer or striker, an electro-magnet to actuate said hammer or striker, and governed in its operation by the electro-magnets actuating the movable stops and by the positioning device or arm, substantially as described.

16. In an electro-mechanical type-writer, the combination of the following instrumentalities, viz: a movable type-carrier provided with a plurality of characters, an electro-magnet to move the said type-carrier, a positioning arm or device, a stop to engage said arm or device to limit the movement of the said carrier, a hammer or striker, and an electro-magnet to operate said hammer or striker, controlled in its operations by the said stop and positioning arm or device, substantially as described.

17. In an electro-mechanical type-writer, the combination of the following instrumentalities, viz: a type-carrier provided with a plurality of characters arranged in substantially horizontal and vertical rows, a plurality of electro-magnets to effect the movement of the said carrier in one direction, electro-magnets to effect movement of the said carrier in a different direction, a positioning device or arm movable with the said type-carrier, stops or pins to co-operate with said arm or device, electro-magnets to operate said stops or pins, a hammer or striker, an electro-magnet to operate it, controlled by the operation of the pin-magnets, substantially as described.

18. In an electro-mechanical type-writer, the combination of the following instrumentalities, viz: a type-carrier provided with a plurality of characters arranged in substantially horizontal and vertical rows, a plurality of electro-magnets to effect the movement of the said carrier in one direction, electro-magnets to effect movement of the said carrier in a different direction, a positioning arm or device movable with the said type-carrier, stops to co-operate with said arm or device, electro-magnets to operate said stops or pins, and a transforming device to control the circuits of the electro-magnets effecting the movements of the type-carrier, substantially as described.

19. In an electro-mechanical type-writer, the combination of the following instrumentalities, viz: a type-carrier provided with a plurality of characters arranged in substantially horizontal and vertical rows, a plurality of electro-magnets to effect the movement of the said carrier in one direction, electro-magnets to effect movement of the said carrier in a different direction, a positioning device or arm movable with the said type-carrier, stops or pins to co-operate with said arm or device, electro-magnets to operate said stops or pins, a transforming device, as D, governing the circuits of the electro-magnets on one side of the same, and a second circuit controlling or transforming device governing the circuits on the other side of the said electro-magnets, substantially as described.

20. In an electro-mechanical type-writer, the combination of the following instrumentalities, viz: a type-carrier provided with a plurality of characters, an electro-magnet to move it in one direction, a second electro-magnet to move it in a different direction, a positioning device or arm, a series of stops or pins to co-operate with the said positioning arm or device, a striker or hammer, an electro-magnet to operate it, a local circuit in which the hammer-operating magnet is located, and independent branches for said local circuit, controlled by the positioning-arm, and the stop-operating magnets, substantially as described.

21. In an electro-mechanical type-writer, the combination of the following instrumentalities, viz: a type-carrier provided with a plurality of characters arranged in substantially horizontal and vertical rows, a plurality of electro-magnets to elevate the said type-carrier different distances, electro-magnets to positively effect the movement of the type-carrier in a different direction, a positioning device or arm movable with the said type-carrier, stops or pins to co-operate with said arm or device, electro-magnets to operate said stops or pins, a movable carriage, an electro-magnet to effect the movement of the carriage in a forward direction across the face of the type-carrier, a hammer or striker, an electro-magnet to operate it, mechanism to effect the movement of the carriage in a backward direction, and an electro-magnet to govern the operation of the said mechanism, substantially as described.

22. In an electro-mechanical type-writer, the combination of the following instrumentalities, viz: a type-carrier provided with a plurality of characters arranged in substantially horizontal and vertical rows, a plurality of electro-magnets to elevate the said type-carrier, electro-magnets to effect the movement of the type-carrier in a different direction, a positioning device or arm movable with the said type-carrier, stops or pins to co-operate with the said arm or device, electro-magnets to operate said stops or pins, a movable carriage, an electro-magnet to govern the movement of the carriage in a forward direction and itself controlled by the operation of the pin-magnets, a hammer or striker, an electro-magnet to operate it, governed by pin-magnets, and releasing-magnets governed by elevating-magnets, substantially as described.

23. In an electro-mechanical type-writer, the combination of the following instrumentalities, viz: a type-carrier provided with a plurality of characters arranged in substantially horizontal and vertical rows, a plurality of electro-magnets to effect the movement of the said carrier in one direction, electro-magnets to effect movement of said carrier in a different direction, a positioning device or arm movable with the said type-carrier, stops or pins to co-operate with said arm or device, electro-magnets to operate said stops or pins, a call-bell, and an electro-magnet to operate it, controlled by pin-magnets, substantially as described.

24. The combination, with an electro-mechanical type-writing or printing instrument, consisting of a movable type-carrier provided with a plurality of characters, electro-magnets to operate it, a hammer or striker, and an electro-magnet to operate said hammer or striker, of a circuit-controlling device consisting of a plurality of independent circuit-terminals connected to independent electro-magnets employed to operate the type-carrier, a movable arm or member provided with a plurality of contact arms or brushes co-operating with the independent circuit-terminals, a battery in circuit with the movable arm or member and with the type-carrier, operating electro-magnets of the instrument, and means to control the circuit of the said battery, substantially as described.

25. The combination, with an electro-mechanical type-writing or printing instrument, consisting of a movable type-carrier provided with a plurality of characters, electro-magnets to operate it, a hammer or striker, and an electro-magnet to operate the said hammer or striker, of a circuit-controlling device consisting of a plurality of independent circuit-terminals connected to independent electro-magnets employed to operate the type-carrier, a movable arm or member provided with a plurality of contact arms or brushes co-operating with the independent circuit-terminals, a battery in circuit with the movable arm or member and with the type-carrier, operating electro-magnets of the instrument, an electro-magnet controlling the circuit of the said battery, a pole-changer in circuit with the circuit-controlling electro-magnet, means to operate the said pole-changer, and means to operate the circuit-controlling magnet and effect the operation of the electro-magnets of the instrument, substantially as described.

26. In an electro-mechanical type-writing or printing instrument, the combination of the following instrumentalities, viz: a type-carrier provided with a plurality of letters or characters, electro-magnets to operate it, a shaft, a disk or support loosely mounted on said shaft and provided with circuit-terminals to which the said electro-magnets are connected, a pawl or arm on said shaft, a ratchet-wheel engaged by said pawl, an arm on said ratchet-wheel, and a stop in the path of movement of the said arm on the ratchet-wheel, substantially as described.

27. The combination, with the shaft $w^5$, provided with a pawl or arm, of a ratchet-wheel having its teeth in engagement with said pawl, an arm on said ratchet-wheel, and a stop in the path of movement of the arm on the ratchet-wheel, substantially as described.

28. In an electro-mechanical type-writing or printing instrument, the combination, with a circuit-terminal carrying-roll $w^4$, of circuit-terminals co-operating with the terminals on the said roll, the circuit-terminal disk or support $w^{47}$, loosely mounted on said roll and adapted to be moved on the roll to vary the position of its terminals with relation to the terminals on the roll, and a contact arm or brush fast to the roll to revolve therewith and co-operating with the circuit-terminals of the disk, substantially as and for the purpose specified.

29. In an electro-mechanical type-writing instrument, the combination of the following instrumentalities, viz: a type-carrier provided with a plurality of letters or characters, an electro-magnet to move it in one direction, a second electro-magnet to move it in another direction, and means to produce a multiplied movement of the type-carrier in the said second direction, a positioning-arm connected to the type-carrier to move therewith, a series of movable stops to co-operate with said positioning-arm, one or more electro-magnets to operate said stops, and circuit-controllers for said electro-magnets, substantially as described.

30. In an electro-mechanical type-writing instrument, the combination of the following instrumentalities, viz: a movable type-carrier provided with a plurality of characters, a positioning-arm secured to said carrier to revolve therewith, movable stops to co-operate with the said arm, electro-magnets to operate said stops, an electro-magnet to revolve said type-carrier, means operated by the electro-magnet to produce a multiplied movement of the type-carrier, and circuit-controllers to govern the operation of the electro-magnets, substantially as described.

31. In an electro-mechanical type-writer, the combination of the following instrumentalities, viz: a movable type-carrier provided with a plurality of characters, an electro-magnet to operate it, means operated by the electro-magnet to produce a multiplied movement of the type-carrier, a positioning device or arm for said type-carrier, means to engage the positioning device or arm and stop the movement of the type-carrier, an electro-magnet to operate said means, a striker or hammer, and an electro-magnet to actuate said hammer, substantially as described.

32. In an electro-machanical type-writer, the combination of the following instrumentalities, viz: a type-carrier provided with a plurality of letters or characters, an electro-magnet to positively move it in one direction, an electro-magnet to positively move it in another direction, a positioning arm or device movable with the type-carrier, movable stops or pins co-operating with the positioning arm or device, electro-magnets to operate said movable stops or pins, a hammer or striker, an electro-magnet to operate it, and circuit-controllers to govern the operation of the electro-magnets, substantially as described.

33. In an electro-mechanical type-writer, the combination of the following instrumentalities, viz: a type-carrier provided with a plurality of letters or characters, an electro-magnet to move it in one direction, a second electro-magnet to move it in another direction at an angle to the first direction, means to produce a multiplied movement of the type-carrier in the second direction, a striker or hammer, an electro-magnet to operate the said hammer or striker, and circuit-controllers to govern the operation of the electro-magnets, substantially as described.

34. In an electro-mechanical type-writer, the combination of the following instrumentalities, viz: a type-carrier provided with a plurality of characters, an ink ribbon or surface extended across the face of the type-carrier, spools upon which the said ribbon is wound, substantially-vertical shafts upon which the said spools are fastened, a hammer or striker to operate on said ribbon, an electro-magnet to operate said hammer or striker, gearing operated by the armature of the hammer-magnet to operate the ribbon-feed, and circuit-controllers for said electro-magnets, substantially as described.

35. In an electro-mechanical type-writer, the combination of the following instrumentalities, viz: a type-carrier provided with a plurality of characters, a shaft or pivot upon which the said type-carrier is mounted to revolve therewith and to move longitudinally thereon, an electro-magnet to positively revolve the type-carrier, a second electro-magnet to effect movement of the type-carrier longitudinally on the shaft and independent of the movement of the shaft, a plurality of circuit-terminals connected to the said electro-magnets, and a plurality of circuit-controllers co-operating with the said terminals, substantially as described.

36. In an electro-mechanical type-writer, the combination of the following instrumentalities, viz: a type-carrier shaft or pivot, a type-carrier longitudinally movable on said shaft or pivot, an electro-magnet to move the type-carrier longitudinally on its shaft, a second electro-magnet to revolve said type-carrier, a positioning arm or device, also actuated by the second electro-magnet, circuit-controllers for said electro-magnets, a hammer or striker, and an electro-magnet to operate it, substantially as described.

37. In an electro-mechanical type-writing instrument, the combination of the following instrumentalities, viz: a type carrier revoluble in opposite directions, a movable arm or device also revoluble in opposite directions, independent electro-magnets to effect the movement of the said arm in opposite directions, movable stops or pins arranged on opposite sides of the normal position of the movable arm or device to co-operate with the said arm or device, independent electro-magnets to operate the said stops or pins, and circuit-controllers to govern the operation of the electro-magnets, substantially as described.

38. In an electro-mechanical type-writing instrument, the combination of the following instrumentalities, viz: a type-carrier having an axial and pivotal movement, an electro-magnet to effect its axial movement, a second electro-magnet to positively effect its pivotal movement, a paper-carriage, and an electro-magnet to effect the movement of the said carriage across the face of the type-carrier, a hammer or striker, an electro-magnet to operate it to effect the printing of a letter or character, circuit-controllers rendered operative by the manipulation of character-keys to operate the electro-magnets governing the movement of the type-carrier, and independent circuit-controllers to govern the operation of the printing-magnet, substantially as described.

39. In an electro-mechanical type-writer, the combination of the following instrumentalities, viz: a movable type-carrier provided with a plurality of characters, an electro-magnet to move it, means operated by the said electro-magnet to produce a multiplied movement of the said type-carrier, a hammer or striker to operate on the type-carrier, a movable paper-carrying carriage, an electro-magnet to effect the movement of the carriage across the face of the type-carrier, and circuit-controllers to govern the operation of the electro-magnets, substantially as described.

40. In an electro-mechanical type-writer, the combination of the following instrumentalities, viz: a movable type-carrier provided with a plurality of characters, a positioning arm or device movable with said type-carrier, movable stops or pins connected together to be moved simultaneously and co-operating with said positioning arm or device, electro-magnets to operate said stops or pins, an electro-magnet to move said type-carrier, and circuit-controllers to govern the operation of the electro-magnets, substantially as described.

41. In an electro-mechanical type-writing instrument, the herein-described transmitter, consisting of character-keys and a plurality of independent circuit-controllers composed of stationary and movable circuit-terminals, a plurality of movable circuit-terminals being operated by each of the said character-keys, substantially as and for the purpose specified.

42. In an electro-mechanical type-writer, the combination of the following instrumentalities, viz: a movable type-carrier provided with a plurality of characters, an electro-magnet to move it, a positioning device or arm movable with the said type-carrier, a plurality of pins or stops to co-operate with the said device or arm, a plurality of electro-magnets to operate the said pins or stops, a local circuit controlled by two or more of the said electro-magnets and an electro-magnet in said local circuit, substantially as described.

43. In an electro-mechanical type-writing instrument, the combination of the following instrumentalities, viz: a movable type-carrier provided with a plurality of characters, a series of electro-magnets to effect the movement of the said type-carrier different distances in the same direction, a second electro-magnet to effect its movement in another direction at an angle to the first direction, an electro-magnet to control the duration of the movement in the second direction, and circuit-controllers to govern the operation of the said electro-magnets, substantially as described.

44. In an electro-mechanical type-writer, the combination, with a movable type-carrier provided with a plurality of characters, of an electro-magnet to move said type-carrier, a positioning arm or device movable with the type-carrier, a plurality of movable stops or pins, a plurality of electro-magnets to operate said stops or pins, circuit-terminals to which the said electro-magnets are connected, character-keys, and a plurality of circuit-controllers positively operated by each character-key, the circuit-controllers operated by a particular character depending upon the position of the character or letter on the type-carrier corresponding to the said particular key, substantially as described.

In testimony whereof we have signed our names to this specification in the presence of two subscribing witnesses.

ALBERT D. NEAL,
HOWARD F. EATON.

Witnesses:
   JAS. H. CHURCHILL,
   SADIE C. FEARING.